(12) United States Patent
Maruyama et al.

(10) Patent No.: US 12,428,118 B2
(45) Date of Patent: Sep. 30, 2025

(54) FUEL CELL SHIP

(71) Applicant: Yanmar Holdings Co., Ltd., Osaka (JP)

(72) Inventors: Takehiro Maruyama, Osaka (JP); Yasuyoshi Yamaguchi, Osaka (JP); Takuya Hiraiwa, Osaka (JP); Manabu Shinagawa, Osaka (JP); Yukihiko Kimura, Kunisaki (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 703 days.

(21) Appl. No.: 17/830,061

(22) Filed: Jun. 1, 2022

(65) Prior Publication Data

US 2022/0388618 A1     Dec. 8, 2022

(30) Foreign Application Priority Data

Jun. 2, 2021 (JP) .................... 2021-092704

(51) Int. Cl.
| | |
|---|---|
| B63H 21/17 | (2006.01) |
| H01M 8/04082 | (2016.01) |
| H01M 8/04119 | (2016.01) |
| B63H 21/00 | (2006.01) |

(52) U.S. Cl.
CPC ........ *B63H 21/17* (2013.01); *H01M 8/04119* (2013.01); *H01M 8/04201* (2013.01); *B63H 2021/003* (2013.01); *H01M 2250/20* (2013.01)

(58) Field of Classification Search
CPC .......... H01M 8/04201; H01M 2250/20; B63H 2021/003; B63H 21/17
See application file for complete search history.

(56) References Cited

U.S. PATENT DOCUMENTS

2018/0339759 A1*  11/2018  Reeh ................. C01B 3/065

FOREIGN PATENT DOCUMENTS

| EP | 4098551 A2 | 12/2022 |
|---|---|---|
| JP | 2006024426 A | 1/2006 |
| JP | 2018-092815 A | 6/2018 |
| WO | 2012007900 A1 | 1/2012 |
| WO | 2022028866 A1 | 2/2022 |

OTHER PUBLICATIONS

JP2006024426 English translation. Kimura et al. Japan. Jan. 26, 2006. (Year: 2006).*
European Search Report dated Jun. 2, 2023 issued for EP Application No. 22175787.5.

* cited by examiner

*Primary Examiner* — Christopher P Domone
(74) *Attorney, Agent, or Firm* — NORTON ROSE FULBRIGHT US LLP

(57) ABSTRACT

An exemplary fuel cell ship is a fuel cell ship for propelling a hull by using electric power supplied from a fuel cell that generates electric power through an electrochemical reaction of fuel, and includes a plurality of compartments including an emission source of the fuel, in which the plurality of compartments include a tank compartment installed therein with a fuel tank that stores the fuel and a fuel cell compartment installed therein with the fuel cell. The tank compartment and the fuel cell compartment are each sealed except for a ventilation port through which the inside of the compartment is ventilated.

16 Claims, 9 Drawing Sheets

FUEL CELL SHIP

CROSS-REFERENCE TO RELATED APPLICATIONS

This application is claims priority under 35 U.S.C. § 119 to JP Application No. 2021-092704 filed Jun. 2, 2021, the entire contents of which are hereby incorporated by reference.

TECHNICAL FIELD

The present invention relates to a fuel cell ship.

BACKGROUND ART

Conventionally, a fuel cell ship in which fuel is supplied from a fuel tank to a fuel cell and a propulsion device is driven by electric power generated by the fuel cell has been proposed (see, for example, Patent Document 1). In Patent Document 1, there is disclosed a configuration where if a lid member of a housing unit that houses a fuel cell unit and a hydrogen fuel tank is fraudulently opened, hydrogen is actively discharged from the hydrogen fuel tank to quickly deplete the fuel so that theft is prevented.

PRIOR ART DOCUMENT

Patent Document

Patent Document 1: Japanese Unexamined Patent Application Publication No. 2018-92815

SUMMARY OF INVENTION

Technical Problem

The fuel supplied to the fuel cell is a combustible gas such as hydrogen. Therefore, in the fuel cell ship, safe design and safety measures in consideration of a risk derived from the fuel are desired. Conventionally, there are known fuel cell ships for the purpose of preventing fuel thefts as described above, but it is considered that there is room for improvement in safety measures.

In view of the above circumstances, it is an object of the present invention to provide a fuel cell ship capable of reducing a risk derived from fuel.

Solution to Problem

An exemplary fuel cell ship according to the present invention is a fuel cell ship for propelling a hull by using electric power supplied from a fuel cell that generates electric power through an electrochemical reaction of fuel, and includes a plurality of compartments including an emission source of the fuel, in which the plurality of compartments include a tank compartment installed therein with a fuel tank that stores the fuel and a fuel cell compartment installed therein with the fuel cell. The tank compartment and the fuel cell compartment are each sealed except for a ventilation port through which the inside of the compartment is ventilated.

Advantageous Effects of Invention

According to the present invention, it is possible to provide a fuel cell ship capable of reducing a risk derived from fuel and improving safety.

DESCRIPTION OF EMBODIMENTS

An embodiment of the present invention will be described below based on the drawings. In this description, a direction is defined as follows. Firstly, a direction from the stern to the bow of the fuel cell ship is "front", and a direction from the bow to the stern is "rear". A lateral direction perpendicular to a front-rear direction is defined as a left-right direction. At this time, when the fuel cell ship is moving forward, the left side is defined as "left" and the right side is defined as "right" when viewed from an operator. The upstream side in the gravity direction perpendicular to the front-rear direction and the left-right direction is referred to as "up", and the downstream side is referred to as "down". Further, in the following, a case where the fuel is a gas will be described as an example, but the fuel is not limited to a gas and may be a liquid.

[1. Schematic Configuration of Fuel Cell Ship]

Figure 1:
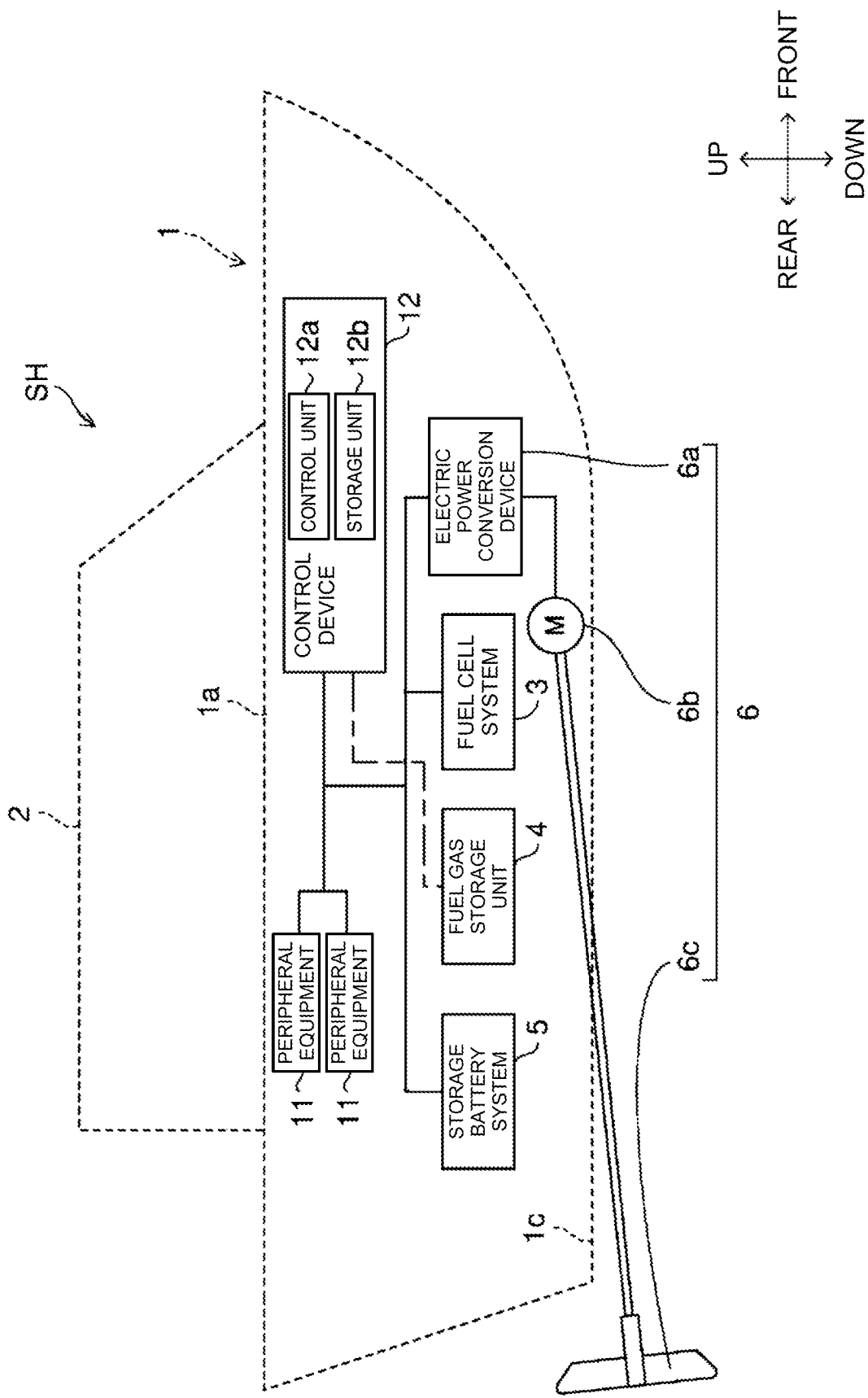
FIG. 1 is an explanatory diagram illustrating a schematic configuration of a fuel cell ship according to an embodiment of the present invention.

Firstly, a fuel cell ship SH according to the present embodiment will be described with reference to FIG. 1. FIG. 1 is an explanatory diagram illustrating a schematic configuration of the fuel cell ship SH. The fuel cell ship SH includes a hull 1 and a cabin 2. The cabin 2 is arranged on the hull 1. In the present embodiment, the cabin 2 includes a bridge.

The fuel cell ship SH further includes a fuel cell system 3, a fuel gas storage unit 4, a storage battery system 5, a propulsion device 6, a plurality of peripheral equipment 11, and a control device 12. In FIG. 1, a control signal or a high voltage power supply line is indicated by a solid line, and a control signal or a low voltage power supply line is indicated by an alternate long and short dash line.

The fuel cell system 3 functions as a main power supply. The fuel cell system 3 consumes a fuel gas to generate electric power (specifically, DC electric power). The fuel gas is a combustible gas. Typically, the fuel gas is hydrogen gas. The fuel cell system 3 supplies generated electric power to the propulsion device 6 and the peripheral equipment 11. The fuel cell system 3 can also supply electric power to the storage battery system 5 to charge the storage battery system 5.

The fuel gas storage unit 4 stores the fuel gas to be supplied to the fuel cell system 3. The fuel gas is supplied from the fuel gas storage unit 4 to the fuel cell system 3 via a fuel gas supply pipe 32 described later (see FIG. 2).

The storage battery system 5 includes a storage battery. The storage battery is, for example, a lithium ion secondary battery, but may also be a nickel-cadmium storage battery, a nickel-hydrogen storage battery, or the like. The storage battery system 5 functions as an auxiliary power source for supplying the stored electric power (specifically, DC electric power) to the propulsion device 6 and the peripheral equipment 11. Thus, if the storage battery system 5 functions as an auxiliary power source, it is possible to compensate for a shortage of electric power supplied from the fuel cell system 3 to the propulsion device 6 or the like. The storage battery system 5 may supply electric power to the control device 12.

The propulsion device 6 is driven by electric power supplied from a below-described fuel cell 31 (see FIG. 2) of the fuel cell system 3, and generates a propulsive force on the hull 1. That is, the fuel cell ship SH propels the hull 1 by using the electric power supplied from the fuel cell 31.

It is noted that the propulsion device 6 may be driven only by the electric power supplied from the storage battery included in the storage battery system 5, or may be driven by the electric power supplied from both the fuel cell 31 and the storage battery. That is, the propulsion device 6 may be driven by the electric power supplied from at least one of the fuel cell and the storage battery to generate the propulsive force on the hull 1.

The propulsion device 6 includes an electric power conversion device 6a, a propulsion motor 6b, and a propeller 6c. The electric power conversion device 6a converts the electric power supplied from the fuel cell system 3 into electric power according to the specifications of the propulsion motor 6b. For example, the electric power conversion device 6a converts DC electric power into AC electric power. In this case, the electric power conversion device 6a has, for example, an inverter. The propulsion motor 6b is driven by electric power (for example, AC electric power) supplied from the electric power conversion device 6a. When the propulsion motor 6b is driven, the rotational force of the propulsion motor 6b is transmitted to the propeller 6c. As a result, the propeller 6c rotates, and a propulsive force is generated on the hull 1. A configuration may be employed in which a marine gear is provided between the propulsion motor 6b and the propeller 6c.

The peripheral equipment 11 include, for example a compressor, a solenoid valve, and a pump. The peripheral equipment 11 also include electrical equipment such as lighting equipment and air conditioning equipment, but the types of peripheral equipment 11 are not particularly limited.

The control device 12 controls the fuel cell system 3, the fuel gas storage unit 4, the storage battery system 5, the propulsion device 6, and a plurality of the peripheral equipment 11. The control device 12 is configured by, for example, one or more computers. The computer is, for example, an electronic control unit (ECU). The control device 12 may be configured by using a programmable logic controller (PLC). The control device 12 is supplied with the electric power from a battery (for example, a lead battery) not illustrated or from the storage battery of the storage battery system 5.

The control device 12 has a control unit 12a and a storage unit 12b. The control unit 12a includes a processor such as a central processing unit (CPU). The storage unit 12b includes a storage device and stores data and computer programs. Specifically, the storage unit 12b includes a main storage device such as a semiconductor memory and an auxiliary storage device such as a semiconductor memory, a solid state drive, and/or a hard disk drive. The storage unit 12b may also include removable media.

The processor of the control unit 12a executes a computer program stored in the storage device of the storage unit 12b to control the fuel cell system 3, the fuel gas storage unit 4, the storage battery system 5, the propulsion device 6, and the plurality of peripheral equipment 11.

[2. Overview of Internal Structure of Fuel Cell Ship]

Figure 2:
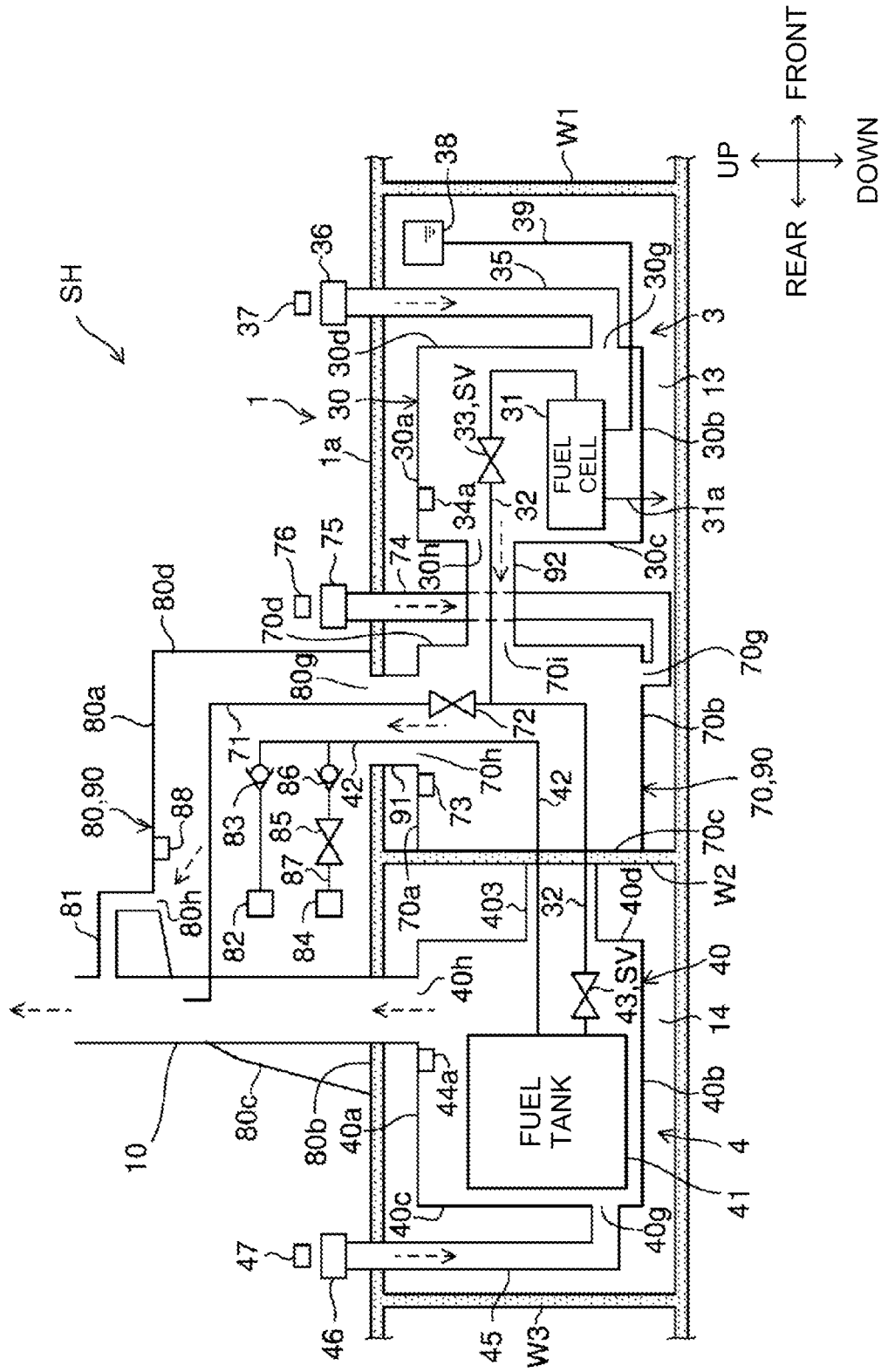
FIG. 2 is an explanatory diagram schematically illustrating an internal structure of the fuel cell ship.

Next, with reference to FIG. 2, an internal structure of the fuel cell ship SH will be described. FIG. 2 is an explanatory diagram schematically illustrating the internal structure of the fuel cell ship SH. In FIG. 2, the air flow is indicated by a dashed line arrow. In FIG. 2, the right side of the drawing is the bow side (front side), the left side of the drawing is the stern side (rear side), and each member is illustrated; however, the position of the member is not limited to the position illustrated in FIG. 2 as long as the connection relationship of the member is maintained.

The fuel cell ship SH includes an engine room 13 and a fuel room 14. The engine room 13 and the fuel room 14 are arranged below a deck 1a of the hull 1. The engine room 13 is located at the front side with respect to the fuel room 14. Partition walls W1, W2, and W3 are located below the deck 1a in order from the front side to the rear side. The engine room 13 is separated from other spaces by the partition walls W1 and W2. The fuel room 14 is separated from other spaces by the partition walls W2 and W3. The partition walls W1 to W3 are configured of, for example, fiber reinforced plastics (FRP), but may be iron plates or the like.

(2-1. Configuration of Fuel Cell System)

The fuel cell system 3 of the fuel cell ship SH is located in the engine room 13. The fuel cell system 3 includes the fuel cell 31, the fuel gas supply pipe 32, and a fuel cell side shutoff valve 33.

The fuel cell 31 generates electric power (specifically, DC electric power) through an electrochemical reaction between the fuel gas and oxidant gas. Typically, the oxidant gas is air and the oxidant is oxygen. That is, the fuel cell 31 generates electric power through the electrochemical reaction of the fuel.

The fuel cell 31 is a fuel cell stack configured by stacking a plurality of cells. For example, each cell of the fuel cell 31 has a solid polymer electrolyte membrane, an anode electrode, a cathode electrode, and a pair of separators. The solid polymer electrolyte membrane is sandwiched between the anode electrode and the cathode electrode. The anode electrode is a negative electrode (fuel electrode). The anode electrode includes an anode catalyst layer and a gas diffusion layer. The cathode electrode is a positive electrode (air electrode). The cathode electrode includes a cathode catalyst layer and a gas diffusion layer. The anode electrode, the solid polymer electrolyte membrane, and the cathode electrode form a membrane electrode assembly (MEA). The pair of separators sandwich the membrane electrode assembly. Each separator has a plurality of grooves. Each groove of one separator forms a flow path for the fuel gas. Each groove of the other separator forms a flow path for the oxidant gas.

In the configuration described above of the fuel cell 31, hydrogen included in the fuel gas is decomposed into hydrogen ions and electrons by the catalyst on the anode electrode side. Hydrogen ions pass through the solid polymer electrolyte membrane and move to the cathode electrode side. On the other hand, the electrons move to the cathode electrode side through an external circuit. As a result, an electric current is generated (electric power is generated). On the cathode electrode side, oxygen included in the oxidant gas combines with the electrons flowing through the external circuit and hydrogen ions transmitting the solid polymer electrolyte membrane to generate water. The generated water is discharged outside the ship via a discharge pipe 31a.

The fuel cell 31 supplies generated electric power to the propulsion device 6 and the peripheral equipment 11 illustrated in FIG. 1. The fuel cell 31 may indirectly supply generated electric power to the propulsion device 6 and the peripheral equipment 11 via a circuit such as a DC/DC converter.

The fuel gas supply pipe 32 is a pipe for supplying a fuel gas stored in a fuel tank 41 described later of the fuel gas storage unit 4 to the anode electrode of the fuel cell 31. That is, the fuel cell ship SH includes the fuel gas supply pipe 32 through which the fuel gas is supplied from the fuel tank 41 to the fuel cell 31.

The fuel cell side shutoff valve 33 is an example of a shutoff valve SV that opens or closes the flow path of the fuel gas supply pipe 32. The opening and closing of the fuel cell side shutoff valve 33 is controlled by the control unit 12a (refer to FIG. 1). More specifically, the fuel cell side shutoff valve 33 switches between supplying and stopping the supply of the fuel gas from the fuel tank 41 to the fuel cell 31, based on the control of the control unit 12a. Although only one fuel cell side shutoff valve 33 is provided in the fuel gas supply pipe 32 in a fuel cell compartment 30 arranged with the fuel cell 31, two or more fuel cell side shutoff valves 33 may be provided. It is noted that the fuel cell compartment 30 provided in the fuel cell ship SH will be described in detail below.

The fuel cell system 3 further includes a cooling medium tank 38 and a cooling medium pipe 39. The cooling medium tank 38 stores cooling medium for cooling the fuel cell 31. The cooling medium may be, for example, an antifreeze liquid having low electrical conductivity. The antifreeze liquid is, for example, a liquid obtained by mixing pure water and ethylene glycol in a predetermined ratio. The cooling medium tank 38 is sealed, but an upper portion may be open.

The cooling medium pipe 39 is a pipe for circulating the cooling medium between the fuel cell 31 and a heat exchanger not illustrated. A circulation pump not illustrated is also provided at a location along the cooling medium pipe 39. The fuel cell 31 is cooled by driving the circulation pump to supply the cooling medium from the heat exchanger to the fuel cell 31 via the cooling medium pipe 39. The cooling medium supplied for cooling the fuel cell 31 is also supplied to the cooling medium tank 38 via the cooling medium pipe 39. Therefore, a volume change due to a temperature change of the cooling medium is absorbed, and the amount of the cooling medium liquid is monitored.

(2-2. Configuration of Fuel Gas Storage Unit)

The fuel gas storage unit 4 of the fuel cell ship SH has the fuel tank 41, a gas filling pipe 42, and a tank side shutoff valve 43.

The fuel tank 41 is a container in which fuel is housed. In the present embodiment, the fuel tank 41 stores the fuel gas to be supplied to the fuel cell 31. The fuel tank 41 may be, for example, a bomb, a cylinder, and a curdle in which a plurality of cylinders are assembled. In FIG. 2, for convenience, only one fuel tank 41 is illustrated, but the number of the fuel tanks 41 is not particularly limited and there may be a plurality of the fuel tanks 41.

The gas filling pipe 42 is a pipe for replenishing the fuel tank 41 with the fuel gas or filling the fuel tank 41 with an inert gas. One end side of the gas filling pipe 42 is connected to the fuel tank 41. The other end side of the gas filling pipe 42 is branched into two, and connected to both a fuel gas filling port 82 and an inert gas filling port 84. The fuel gas filling port 82 and the inert gas filling port 84 are provided in a duct compartment 90 (particularly an upper duct compartment 80) described in detail later.

The above-mentioned inert gas is, for example, nitrogen gas. For example, when the fuel gas remains in the fuel tank 41 in performing maintenance such as inspection or repair of the fuel cell ship SH in the dock (dry dock), there is a danger that an explosion may occur in a case that the fuel gas ignites for some reason. Therefore, at the time of maintenance of the fuel cell ship SH, the fuel tank 41 is filled with the inert gas, and the fuel gas is removed from the fuel tank 41. As a result, it is possible to avoid the danger of explosion.

In the fuel gas supply pipe 32 described above, a side opposite to the side connected with the fuel cell 31 is connected to the fuel tank 41. The fuel tank 41 and the fuel cell 31 are connected via the fuel gas supply pipe 32. That is, the fuel cell ship SH further includes a fuel supply pipe connecting the fuel tank 41 and the fuel cell 31. The fuel gas supply pipe 32 is an example of the fuel supply pipe.

The tank side shutoff valve 43 is an example of a shutoff valve SV that opens or closes the flow path of the fuel gas supply pipe 32. The opening and closing of the tank side shutoff valve 43 is controlled by the control unit 12a. More specifically, the tank side shutoff valve 43 switches between supplying and stopping the supply of the fuel gas from the fuel tank 41 to the fuel cell 31, based on the control of the control unit 12a. Although only one tank side shutoff valve 43 is provided in the fuel gas supply pipe 32 in a tank compartment 40 arranged with the fuel tank 41, two or more tank side shutoff valves 43 may be provided. It is noted that the tank compartment 40 provided in the fuel cell ship SH will be described in detail below.

[3. Compartment in Detail]

The fuel cell ship SH includes a plurality of compartments including an emission source of the fuel. In the present embodiment, the fuel is a fuel gas, and more specifically, a hydrogen gas. The emission source of the fuel includes a wide range of portions from which the fuel gas may be emitted. The emission source of the fuel is, for example, the fuel cell 31, the fuel gas supply pipe 32, and the fuel tank 41.

As illustrated in FIG. 2, in the present embodiment, the plurality of compartments include the fuel cell compartment 30 and the tank compartment 40. The fuel cell compartment 30 is a compartment installed therein with the fuel cell 31. The tank compartment 40 is a compartment installed therein with the fuel tank 41 that stores the fuel.

In the present embodiment, the plurality of compartments further includes the duct compartment 90. The duct compartment 90 is a compartment that houses a part of the fuel supply pipe. Specifically, the duct compartment 90 is configured by a lower duct compartment 70 and the upper duct compartment 80. The lower duct compartment 70 houses a part of the fuel gas supply pipe 32 being an example of a fuel supply pipe. The "part of the fuel gas supply pipe 32" may refer to an entire part or a part of a portion of the fuel gas supply pipe 32 located between the fuel cell compartment 30 and the tank compartment 40. In the present embodiment, the lower duct compartment 70 houses a part of the portion located between the fuel cell compartment 30 and the tank compartment 40 of the fuel gas supply pipe 32. It is noted that the duct compartment 90 is not an essential configuration and may not be provided in some cases. A configuration in which the duct compartment 90 is not provided will be described later.

Figure 3:
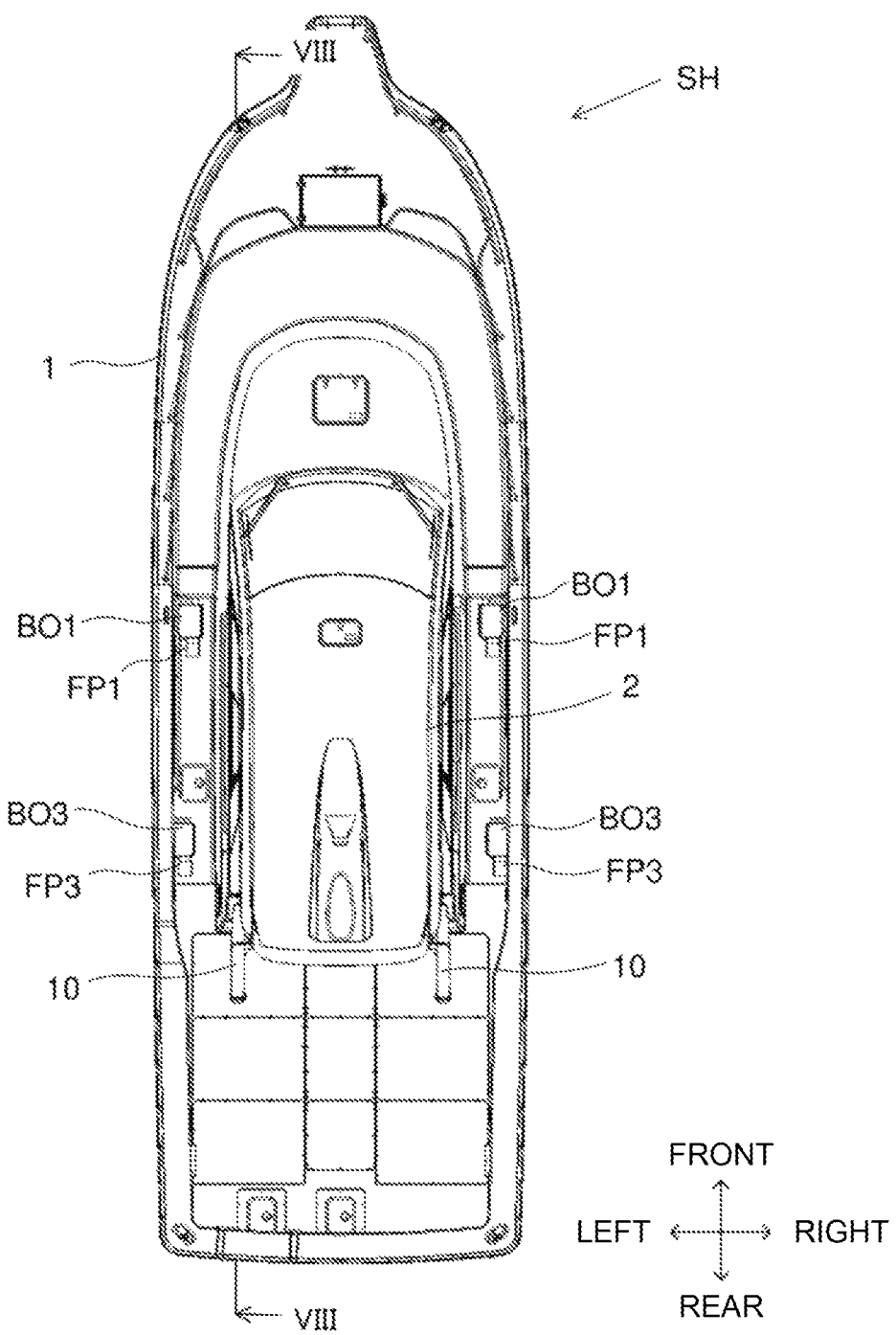
FIG. 3 is a plan view illustrating a detailed example of the fuel cell ship according to an embodiment of the present invention.
Figure 4:
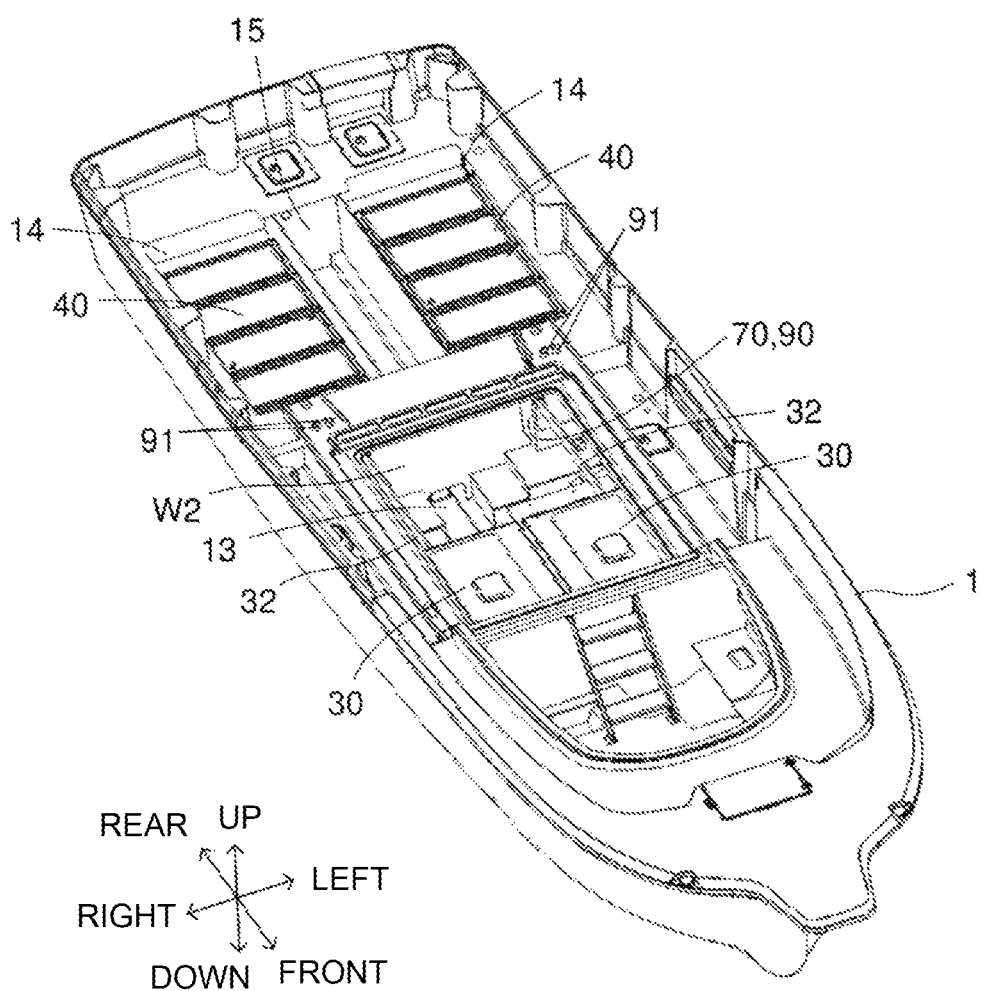
FIG. 4 is a perspective view obtained when a part of configuration such as a cabin is removed from the fuel cell ship illustrated in FIG. 3.
Figure 5:
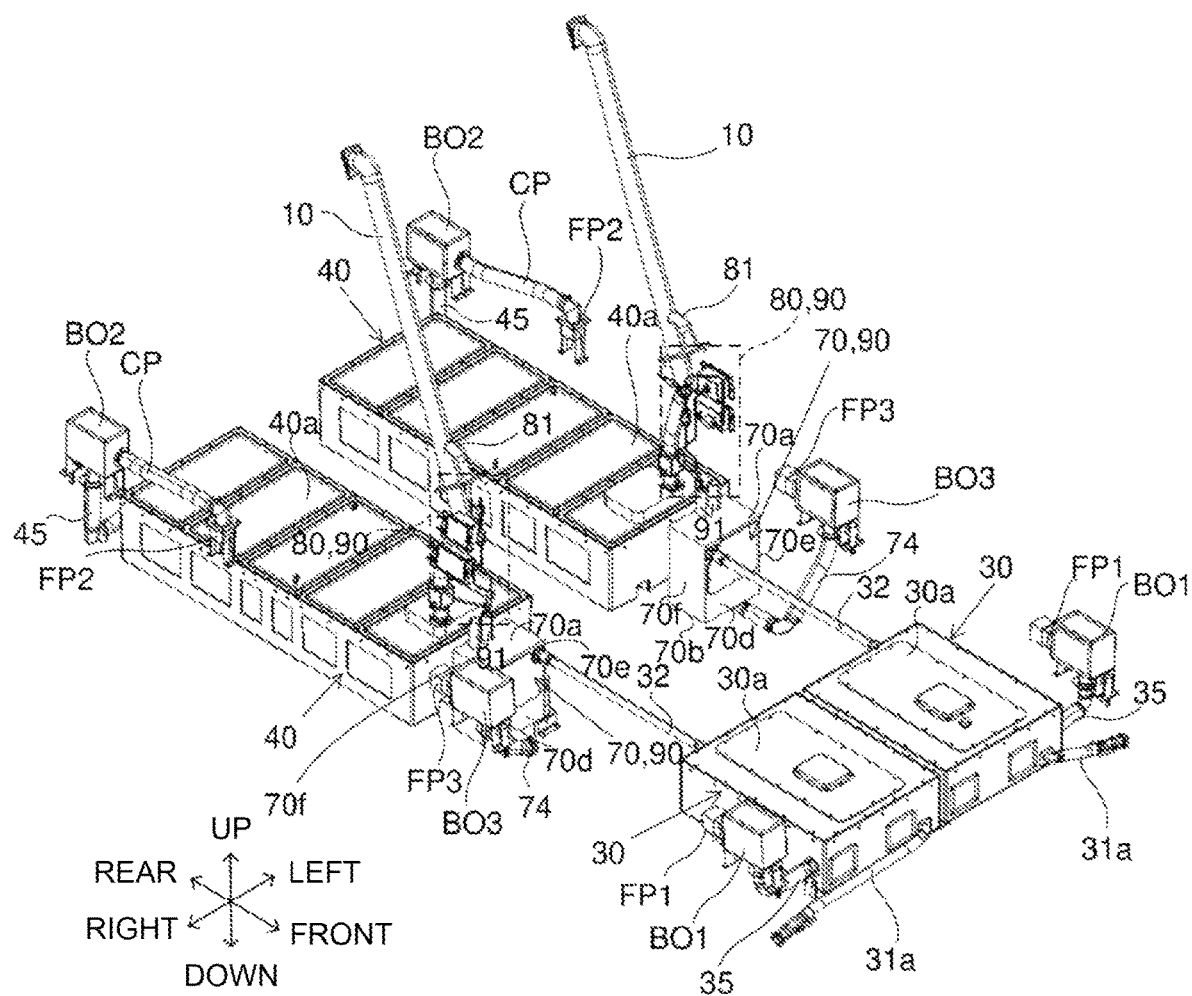
FIG. 5 is a schematic perspective view illustrating a state obtained when a fuel cell compartment, a tank compartment, and a duct compartment provided in the fuel cell ship illustrated in FIG. 4 are extracted.

Configurations of the fuel cell compartment 30, the tank compartment 40, and the duct compartment 90 will be described in detail below. FIG. 3 is a plan view illustrating a detailed example of the fuel cell ship SH. FIG. 4 is a perspective view obtained when a part of configuration such as the cabin 2 is removed from the fuel cell ship SH illustrated in FIG. 3. It is noted that in FIG. 4, a part of the deck 1a is also removed so that the tank compartment 40 and the duct compartment 90 can be seen. FIG. 5 is a schematic perspective view illustrating a state obtained when the fuel cell compartment 30, the tank compartment 40, and the duct compartment 90 provided in the fuel cell ship SH illustrated in FIG. 4 are extracted.

In the fuel cell ship SH illustrated in FIG. 3, the upper duct compartment 80, which is a part of the duct compartment 90, is configured by using the cabin 2. Therefore, in FIG. 4 illustrating the fuel cell ship SH from which the cabin 2 is removed, the upper duct compartment 80 is not illustrated. Also in FIG. 5, the upper duct compartment 80 is not illustrated in detail, and a surrounding area of the upper duct compartment 80 is illustrated by a broken line frame.

As illustrated in FIGS. 4 and 5, in the present embodiment, in the fuel cell ship SH, the fuel cell compartment 30, the tank compartment 40, and the duct compartment 90 are arranged on each of the left side (port side) and the right side (starboard side) of the hull 1. That is, the equipment necessary for generating the electric power using the fuel cell 31 is provided on each of the left and right sides of the hull 1. Thus, FIG. 2 above is a diagram illustrating, in detail, the configuration of one side portion (one board) of the hull 1.

In the present embodiment, the fuel cell compartment 30, the duct compartment 90, and the tank compartment 40 are arranged in this order from the front to the rear on each of the left and right sides. The configurations of the compartments 30, 40, and 90 are the same in the left and right compartments. In the present embodiment, each compartment set includes two fuel cell compartments 30, tank compartments 40, and duct compartments 90. However, this is an example, and the number of the compartment sets may be one or three or more.

(3-1. Fuel Cell Compartment)

Figure 6:
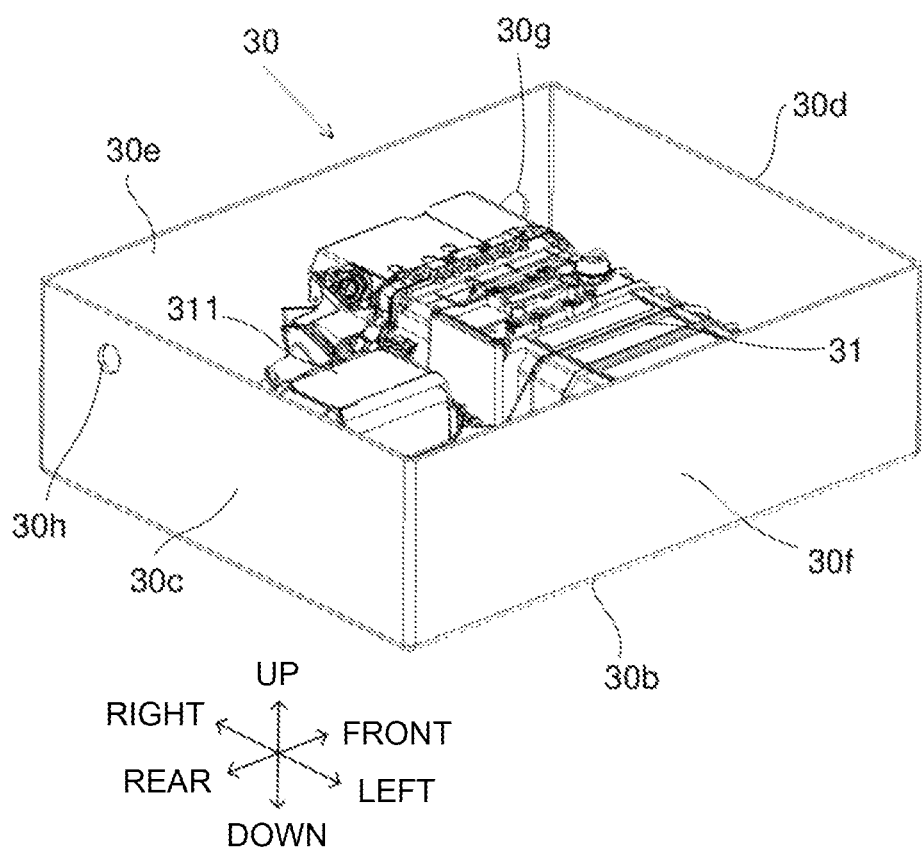
FIG. 6 is a schematic perspective view obtained when a top wall of the fuel cell compartment illustrated in FIG. 5 is removed.

The fuel cell compartment 30 is a housing body for housing the fuel cell 31 (see, for example, FIG. 2 and FIG. 6 described later). The fuel cell compartment 30 is arranged in the engine room 13 (see, for example, FIGS. 2 and 4). The fuel cell compartment 30 has a hollow shape. The fuel cell compartment 30 can also be thought of as a container, a chamber, or a box that houses the fuel cell 31.

In the present embodiment, the fuel cell compartment 30 has a hollow and substantially rectangular parallelepiped shape. An outer wall configuring the fuel cell compartment 30 includes, for example, a top wall 30a, a bottom wall 30b, a rear wall 30c, a front wall 30d, a left wall 30e, and a right wall 30f (for example, see FIGS. 2, 5, and 6 described later). It is noted that the shape of the fuel cell compartment 30 is not particularly limited as long as it has a space capable of housing the fuel cell 31. The material of the outer wall of the fuel cell compartment 30 is, for example, FRP, but may be an iron plate and the like.

In detail, the fuel cell compartment 30 is a configuration in which the top wall 30a is attached to a box-shaped members in which the bottom wall 30b, the rear wall 30c, the front wall 30d, the left wall 30e, and the right wall 30f are formed of a single member. FIG. 6 is a schematic perspective view obtained by removing the top wall 30a of the fuel cell compartment 30 illustrated in FIG. 5. In detail, FIG. 6 illustrates the fuel cell compartment 30 located on the left side of the hull 1. As illustrated in FIG. 6, in detail, the fuel cell compartment 30 houses a DC/DC converter 311 in addition to the fuel cell 31. In detail, the DC/DC converter 311 boosts the voltage of the electric power generated by the fuel cell 31. It is noted that the DC/DC converter 311 may be arranged outside the fuel cell compartment 30.

As illustrated in FIG. 2, a part of the fuel gas supply pipe 32 described above and the fuel cell side shutoff valve 33 are further housed in the fuel cell compartment 30. A cell compartment internal gas detector 34a is further housed in the fuel cell compartment 30. The cell compartment internal gas detector 34a is a fuel gas detector arranged inside the fuel cell compartment 30. For example, when the fuel gas is hydrogen gas, the cell compartment internal gas detector 34a is configured by a hydrogen gas detection sensor.

The cell compartment internal gas detector 34a is arranged on an inner surface of the top wall 30a located at an upper part of the fuel cell compartment 30. Hydrogen gas as the fuel gas is lighter than air and rises. Therefore, if the cell compartment internal gas detector 34a is arranged on the top wall 30a of the fuel cell compartment 30, leaked fuel gas can be appropriately detected by the cell compartment internal gas detector 34a even if the fuel gas leaks in the fuel cell compartment 30.

When the cell compartment internal gas detector 34a detects a fuel gas in the fuel cell compartment 30, a detection signal is sent from the cell compartment internal gas detector 34a to the control unit 12a. As a result, the control unit 12a can control the fuel cell side shutoff valve 33 provided in the fuel gas supply pipe 32 to stop the supply of the fuel gas from the fuel tank 41 to the fuel cell 31.

The fuel cell compartment 30 includes a ventilation port for ventilating the inside of the compartment. In detail, as illustrated in FIGS. 2 and 6, the ventilation port of the fuel cell compartment 30 includes a cell compartment air supply port 30g and a cell compartment exhaust port 30h.

The cell compartment air supply port 30g is provided on one of the left and right outer walls of the fuel cell compartment 30. In the fuel cell compartment 30 on the left side of the hull 1, the cell compartment air supply port 30g is configured to include an opening penetrating the left wall 30e in the left-right direction. In the fuel cell compartment 30 on the right side of the hull 1, the cell compartment air supply port 30g is configured to include an opening penetrating the right wall 30f in the left-right direction. The cell compartment air supply port 30g is connected to a cell compartment air supply pipe 35 described later. It is noted that a place where the cell compartment air supply port 30g is provided may be appropriately changed, and may be another outer wall configuring the fuel cell compartment 30.

The cell compartment exhaust port 30h is provided on the rear wall 30c of the fuel cell compartment 30 in each of the fuel cell compartments 30 arranged on the left and right sides of the hull 1. The cell compartment exhaust port 30h is configured to include an opening penetrating the rear wall 30c in the front-rear direction. The cell compartment exhaust port 30h communicates with the duct compartment 90, which will be described later. The cell compartment exhaust port 30h may be provided on an outer wall other than the rear wall 30c in the fuel cell compartment 30.

The cell compartment air supply pipe 35 is connected to the fuel cell compartment 30. The cell compartment air supply pipe 35 extends from the cell compartment air supply port 30g of the fuel cell compartment 30 to the deck 1a and is exposed from the top of the deck 1a. A cell compartment air supply device 36 and a cell compartment external gas detector 37 are arranged at an end on the deck 1a side of the cell compartment air supply pipe 35. More particularly, the cell compartment air supply device 36 and the cell compartment external gas detector 37 are arranged above the deck 1a.

The cell compartment air supply device 36 supplies air outside the fuel cell compartment 30 (in the present example, air outside the ship) to the inside of the fuel cell compartment 30 via the cell compartment air supply pipe 35 and the cell compartment air supply port 30g. Due to the supply of air outside the fuel cell compartment 30, the air inside the fuel cell compartment 30 is discharged to the duct compartment 90 via the cell compartment exhaust port 30hf. Thus, the inside of the fuel cell compartment 30 is ventilated. As a result, it is possible to prevent a combustible gas (for example, a fuel gas leaking from the fuel cell 31) from staying in the fuel cell compartment 30.

The cell compartment air supply device 36 is configured by, for example, an inexpensive non-explosion-proof air supply fan, but may be configured by an explosion-proof air supply fan. The drive of the cell compartment air supply device 36 is controlled by the control unit 12a. The cell compartment air supply device 36 is housed in an air supply device housing BO1 (see, for example, FIGS. 3 and 5) fixedly arranged on the deck 1a. The material configuring the air supply device housing BO1 is not particularly limited, but is configured of a metal such as stainless steel.

A filter unit FP1 is arranged adjacent to the air supply device housing BO1 that houses the cell compartment air supply device 36. The inside of the air supply device housing BO1 and the inside of the filter unit FP1 communicate with each other. One or more filters are arranged inside the filter unit FP1. When the filter unit FP1 is arranged, it is possible to prevent dust and the like from entering the fuel cell compartment 30. In the present embodiment, a dustproof filter and a salt damage countermeasure filter are arranged in the filter unit FP1. As a result, it is possible to prevent dust and sea salt particles from entering the fuel cell compartment 30.

It is noted that a configuration may be employed where only the salt damage countermeasure filter is arranged in the filter unit FP1, and even in this configuration, it is possible to remove the dust and sea salt particles. However, as the configuration where the dustproof filter and the salt damage countermeasure filter are arranged in the filter unit FP1, it is preferable to arrange the dustproof filter on the upstream side of the air flow generated by the cell compartment air supply device 36 with respect to the salt damage countermeasure filter. With such a configuration, it is possible to remove the dust by the dustproof filter before the salt damage countermeasure filter, and it is possible to remove the dust and the sea salt particles while extending the life of the expensive salt damage countermeasure filter.

The cell compartment external gas detector 37 detects a combustible gas (for example, hydrogen gas floating around the hull 1) flowing into the fuel cell compartment 30 from the outside. The cell compartment external gas detector 37 is, for example, a combustible gas sensor such as a hydrogen gas sensor. In the present embodiment, the cell compartment external gas detector 37 is arranged in the air supply device housing BO1. The cell compartment external gas detector 37 is, for example, arranged on a side opposite to the cell compartment air supply pipe 35 with respect to the cell compartment air supply device 36, that is, on the upstream side of the air flow from the outside into the fuel cell compartment 30. The cell compartment external gas detector 37 may be configured by a gas sensor that detects a combustible gas other than hydrogen gas. Examples of the combustible gas other than hydrogen gas include methane, ethane, propane, and carbon monoxide.

The cell compartment external gas detector 37 outputs, for example, a detection signal indicating the concentration of the combustible gas to the control unit 12a. This allows the control unit 12a to determine, based on the detection signal, whether the concentration of the combustible gas is equal to or greater than a predetermined threshold value. Then, if the concentration is equal to or greater than the predetermined threshold value, the control unit 12a can control the fuel cell side shutoff valve 33 to stop the supply of the fuel gas from the fuel tank 41 to the fuel cell 31. The above-mentioned predetermined threshold value may be determined based on experiments and/or experience.

It is noted that on the top wall 30a located at an upper part of the fuel cell compartment 30, the above-described cell compartment internal gas detector 34a (see FIG. 2) is preferably arranged at a location near the cell compartment exhaust port 30h or inside the cell compartment exhaust port 30h. In an unlikely event of fuel gas leak in the fuel cell compartment 30, the leaked fuel gas is exhausted through the cell compartment exhaust port 30h. That is, the cell compartment exhaust port 30h is located on the most downstream side of the flow path through which the fuel gas flows when the fuel gas leaks inside the fuel cell compartment 30. Therefore, when the cell compartment internal gas detector 34a is arranged at a location near the cell compartment exhaust port 30h or inside the cell compartment exhaust port 30h, even if the fuel gas leaks at any location inside the fuel cell compartment 30, it is possible to improve the possibility that the leaked fuel gas can be detected. That is, the cell compartment internal gas detector 34a may be configured to be located on the most downstream side of the flow path through which the fuel gas flows when the fuel gas leaks.

The fuel cell compartment 30 has a sealed space therein except for the cell compartment air supply port 30g and the cell compartment exhaust port 30h. That is, the fuel cell compartment 30 is sealed except for the cell compartment air supply port 30g and the cell compartment exhaust port 30h. In other words, the fuel cell compartment 30 is sealed except for a ventilation port for ventilating the inside of the compartment (own compartment). Due to the sealed structure, as a general rule, the air entering the fuel cell compartment 30 from the cell compartment air supply port 30g by driving the cell compartment air supply device 36 passes through the cell compartment exhaust port 30h and is exhausted from the fuel cell compartment 30.

To ensure sealing, a sealing material is appropriately arranged at a place where a gap may occur. For example, a sealing material is arranged in a portion where a plurality of members are arranged in combination. For example, the sealing material is arranged between the box-shaped member configuring the bottom wall 30b, the rear wall 30c, the front wall 30d, the left wall 30e, and the right wall 30f, and the top wall 30a. Also, for example, the sealing material is arranged in a screw stopper portion. For example, the sealing material is appropriately arranged at an appropriate position in a hole which is provided in the fuel cell compartment 30 and through which an electrical wiring and a piping pass.

(3-2. Tank Compartment)

The tank compartment 40 is a housing body for housing the fuel tank 41 (see, for example, FIG. 2 and FIG. 7 described later). The tank compartment 40 is arranged in the fuel room 14 (see, for example, FIGS. 2 and 4). The tank compartment 40 has a hollow shape. The tank compartment 40 can also be thought of as a container, a chamber, or a box that houses the fuel tank 41.

As illustrated in FIG. 4, in the present embodiment, the fuel room 14 provided behind the engine room 13 and arranged with the tank compartment 40 is divided into two. That is, In the present embodiment, there are two fuel rooms 14. A battery room 15 that houses therein a storage battery (not illustrated) of the storage battery system 5 is arranged between the two fuel rooms 14 in the left-right direction. Thus, when the fuel room 14 and the battery room 15 are arranged together at the rear of the hull 1, it is possible to efficiently utilize the space of the hull 1 and reduce the size of the hull 1.

In the present embodiment, the tank compartment 40 has a hollow and substantially rectangular parallelepiped shape. A longitudinal direction of the tank compartment 40 arranged in the fuel room 14 corresponds to a front-rear direction. An outer wall configuring the tank compartment 40 includes, for example, a top wall 40a, a bottom wall 40b, a rear wall 40c, a front wall 40d, a left wall 40e, and a right wall 40f (for example, see FIGS. 2, 5, and 7 described later). It is noted that the shape of the tank compartment 40 is not particularly limited as long as it has a space capable of housing at least one fuel tank 41. The material of the outer wall of the tank compartment 40 is, for example, FRP, but may be an iron plate and the like.

In detail, the tank compartment 40 is configured so that the top wall 40a is attached to a box-shaped members in which the bottom wall 40b, the rear wall 40c, the front wall 40d, the left wall 40e, and the right wall 40f are configured by a single member. FIG. 7 is a schematic perspective view obtained when a part of the top wall 40a of the tank compartment 40 illustrated in FIG. 5 is removed. In detail, FIG. 7 illustrates the tank compartment 40 located on the left side of the hull 1.

In the present embodiment, the above-mentioned box-shaped member configuring the tank compartment 40 is formed of FRP. The left wall 40e and the right wall 40f are provided with a thin wall part 401 having a thickness thinner in the left-right direction than other portions. A plurality of the thin wall parts 401 are provided on each of the left wall 40e and the right wall 40f. The plurality of thin wall parts 401 have a rectangular shape and are arranged at intervals in the front-rear direction. The thin wall part 401 of the left wall 40e and the thin wall part 401 of the right wall 40f are arranged to face each other in the left-right direction. In the present embodiment, the thin wall part 401 of the left wall 40e and the thin wall part 401 of the right wall 40f are arranged symmetrically with respect to the bisector dividing the above-mentioned box-shaped member into left and right halves. When the thin wall part 401 is provided, it is possible to reduce the weight while maintaining the strength required for the housing body configuring the tank compartment 40.

The thin wall part 401 may not be provided. When the thin wall part 401 is provided, the shape, the number, and arrangement of the thin wall part 401 may be appropriately changed from the configuration of the present embodiment.

A frame member 402 formed of a metal such as aluminum is arranged on the upper part of the above-mentioned box-shaped member configuring the tank compartment 40. When the frame member 402 is arranged, it is possible to improve the strength of the housing body configuring the tank compartment 40. When a member such as an eyebolt is attached to the frame member 402, it is possible to lift and install the tank compartment 40 by a crane or the like in building the hull. The frame member 402 includes a frame part 402a having a rectangular shape in a plan view from above, and a plurality of bridging parts 402b that bridge the left and right portions of the frame part 402a. The frame part 402a is arranged on the outer edge of the above-mentioned box-shaped member. The plurality of bridging parts 402b extending in the left-right direction are all linear, and are arranged at intervals in the front-rear direction. When the plurality of bridging parts 402b are arranged, a plurality of rectangular frame member openings 402c are arranged in the front-rear direction in a portion surrounded by the frame member 402.

In detail, the top wall 40a configuring the tank compartment 40 is configured to be divided into a plurality of parts. That is, there are a plurality of the top walls 40a. It is noted that there may be one top wall 40a, but if the top wall 40a is divided into a plurality of parts, for example, it is possible to improve handleability. Each of the plurality of top walls 40a is arranged to cover a frame member opening 402c.

In the present embodiment, the front wall 40d of the tank compartment 40 is provided with a tubular part 403 covering the fuel gas supply pipe 32 and the gas filling pipe 42 that project forward from the tank compartment 40. When the tubular part 403 is arranged, a double pipe structure can be obtained, and even if the fuel gas leaks from the fuel gas supply pipe 32 or the gas filling pipe 42, it is possible to prevent the fuel gas from leaking to the fuel room 14. In the present embodiment, a configuration is employed where the two pipes 32 and 42 pass through one tubular part 403, but a tubular part may be provided for each of the pipes 32 and 42. That is, a plurality of tubular parts forming the double pipe structure may be provided in the tank compartment 40.

Figure 7:
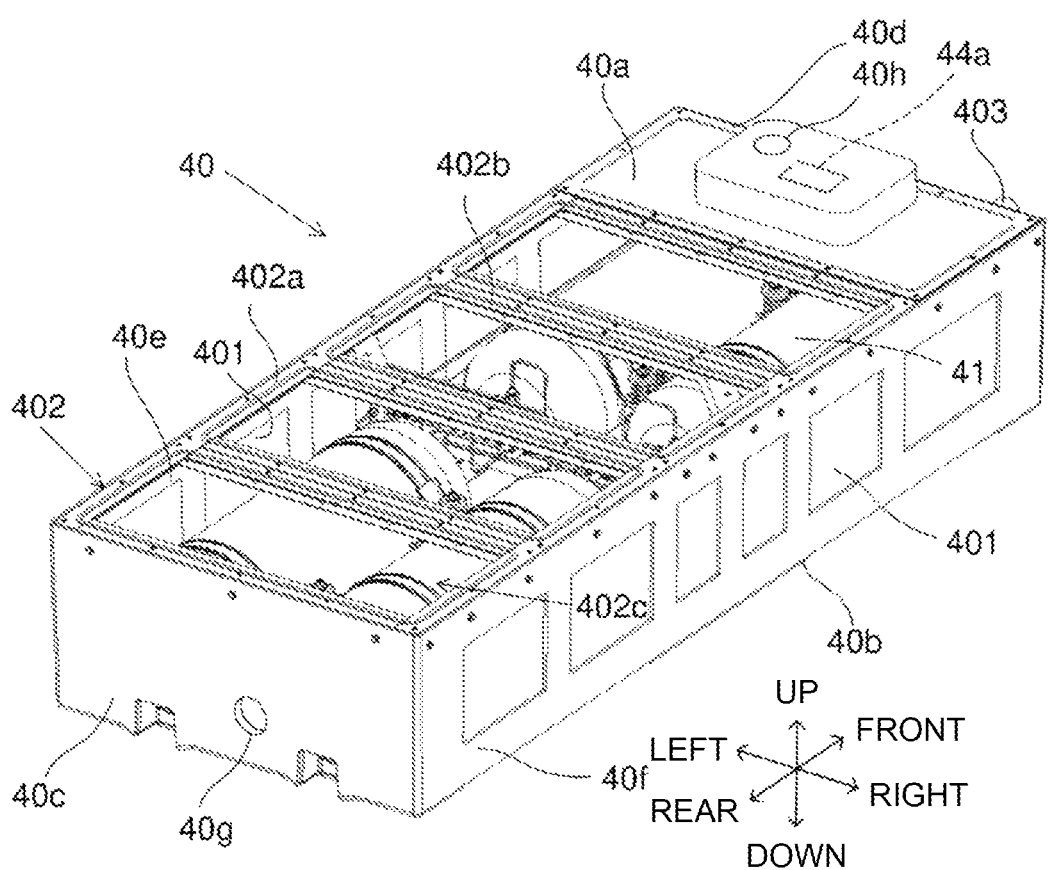
FIG. 7 is a schematic perspective view obtained when a part of the top wall of the tank compartment illustrated in FIG. 5 is removed.

As illustrated in FIG. 7, the four fuel tanks 41 are arranged in the tank compartment 40. The number of the fuel tanks 41 housed in the tank compartment 40 may be appropriately changed, and one or more fuel tanks 41 may be provided. As illustrated in FIG. 2, a part of the fuel gas supply pipe 32 described above and the tank side shutoff valve 43 are further housed in the tank compartment 40. In the tank compartment 40, the tank compartment internal gas detector 44a is further housed. The tank compartment internal gas detector 44a is a fuel gas detector arranged inside the tank compartment 40. For example, if the fuel gas is hydrogen gas, the tank compartment internal gas detector 44a is configured by a hydrogen gas detection sensor.

The tank compartment internal gas detector 44a is arranged on an inner surface of the top wall 40a located at an upper part of the tank compartment 40. Hydrogen gas as the fuel gas is lighter than air and rises. Therefore, if the tank compartment internal gas detector 44a is arranged on the top wall 40a of the tank compartment 40, leaked fuel gas can be appropriately detected by the tank compartment internal gas detector 44a even if the fuel gas leaks in the tank compartment 40.

When the tank compartment internal gas detector 44a detects the fuel gas inside the tank compartment 40, a detection signal is sent from the tank compartment internal gas detector 44a to the control unit 12a. As a result, the control unit 12a can control the tank side shutoff valve 43 provided in the fuel gas supply pipe 32 to stop the supply of the fuel gas from the fuel tank 41 to the fuel cell 31.

The tank compartment 40 includes a ventilation port for ventilating the inside of the compartment. In detail, as illustrated in FIGS. 2 and 7, the ventilation port of the tank compartment 40 includes a tank compartment air supply port 40g and a tank compartment exhaust port 40h.

The tank compartment air supply port 40g is provided on the rear wall 40c of the tank compartment 40. The tank compartment air supply port 40g is configured to include an opening penetrating the rear wall 40c in the front-rear direction. The tank compartment air supply port 40g is connected to a tank compartment air supply pipe 45 described later. It is noted that a place where the tank compartment air supply port 40g is provided may be appropriately changed, and may be another outer wall configuring the tank compartment 40.

The tank compartment exhaust port 40h is provided on the top wall 40a of the tank compartment 40. As described above, in the present embodiment, the top wall 40a of the tank compartment 40 is configured by a plurality of the top walls 40a arranged in the front-rear direction. The tank compartment exhaust port 40h is arranged on the top wall 40a arranged at the frontmost of the plurality of top walls 40a. However, among the plurality of top walls 40a, the top wall 40a provided with the tank compartment exhaust port 40h may be other than the frontmost top wall 40a. The tank compartment exhaust port 40h is configured to include an opening penetrating the top wall 40a in the up-down direction. The tank compartment exhaust port 40h communicates with a vent pipe 10. The vent pipe 10 is a pipe for guiding air inside the tank compartment 40 to the outside of the ship. The tank compartment exhaust port 40h may be provided on an outer wall instead of the top wall 40c in the tank compartment 40.

The tank compartment air supply pipe 45 is connected to the tank compartment 40. The tank compartment air supply pipe 45 extends from the tank compartment air supply port 40g of the tank compartment 40 to the deck 1a, and is exposed from the top of the deck 1a. A tank compartment air supply device 46 and a tank compartment external gas detector 47 are arranged at an end on the deck 1a side of the tank compartment air supply pipe 45. The tank compartment air supply device 46 and the tank compartment external gas detector 47 are arranged above the deck 1a.

The tank compartment air supply device 46 supplies air outside the tank compartment 40 (in the present example, air outside the ship) to the inside of the tank compartment 40 via the tank compartment air supply pipe 45 and the tank compartment air supply port 40g. Due to the supply of air outside the tank compartment 40, the air inside the tank compartment 40 is discharged to the vent pipe 10 through the tank compartment exhaust port 40h. Thus, the inside of the tank compartment 40 is ventilated. As a result, even if the fuel gas leaks from the fuel tank 41 in the tank compartment 40, the retention of the fuel gas can be suppressed.

The tank compartment air supply device 46 is configured by, for example, an inexpensive non-explosion-proof air supply fan, but may be configured by an explosion-proof air supply fan. The drive of the tank compartment air supply device 46 is controlled by the control unit 12a. Similarly to the above-described cell compartment air supply device 36, the tank compartment air supply device 46 is housed in an air supply device housing BO2 (see, for example, FIG. 5) fixedly arranged on the deck 1a. A filter unit FP2 is connected to the air supply device housing BO2 that houses the tank compartment air supply device 46.

It is noted that the filter unit FP2 is configured in much the same way as the above-described cell compartment air supply device 36. However, the filter unit FP2 connected to the air supply device housing BO2 housing the tank compartment air supply device 46 is not adjacent to the air supply device housing BO2, and is connected to the air supply device housing BO2 via a connection pipe CP. Thus, when the connection pipe CP is provided, it is possible to arrange a suction port for external air when the tank compartment air supply device 46 is driven, at an appropriate position where safety is considered. For example, it is possible to set a distance from the opening leading to the tank compartment 40 (opening on an atmosphere side of the filter unit FP2) to other equipment or the air supply port to a predetermined distance or more.

The tank compartment external gas detector 47 detects a combustible gas (for example, hydrogen gas floating around the hull 1) flowing into the tank compartment 40 from the outside. The tank compartment external gas detector 47 is, for example, a combustible gas sensor such as a hydrogen gas sensor. In the present embodiment, the tank compartment external gas detector 47 is arranged in the air supply device housing BO2. The tank compartment external gas detector 47 is arranged on a side opposite to the tank compartment air supply pipe 45 with respect to the tank compartment air supply device 46, that is, on the upstream side of the air flow from the outside into the tank compartment 40. The tank compartment external gas detector 47 may be configured by a gas sensor that detects a combustible gas other than hydrogen gas.

The tank compartment external gas detector 47 outputs, for example, a detection signal indicating the concentration of the combustible gas to the control unit 12a. This allows the control unit 12a to determine, based on the detection signal, whether the concentration of the combustible gas is equal to or greater than a predetermined threshold value. Then, if the concentration is equal to or greater than the predetermined threshold value, the control unit 12a can control the tank side shutoff valve 43 to stop the supply of the fuel gas from the fuel tank 41 to the fuel cell 31. The above-mentioned predetermined threshold value may be determined based on experiments and/or experience.

It is noted that the above-described tank compartment internal gas detector 44a (see FIG. 2) is arranged on the top wall 40a located at the upper part of the tank compartment 40 at a position close to the tank compartment exhaust port 40h or inside the tank compartment exhaust port 40h. In an unlikely event of fuel gas leak from the fuel tank 41 in the tank compartment 40, the leaked fuel gas goes toward the vent pipe 10 through the tank compartment exhaust port 40h. That is, the tank compartment exhaust port 40h is located on the most downstream side of the flow path through which the fuel gas flows when the fuel gas leaks inside the tank compartment 40. Therefore, when the tank compartment internal gas detector 44a is arranged at a location near the tank compartment exhaust port 40h or inside the tank compartment exhaust port 40h, even if the fuel gas leaks at any location inside the tank compartment 40, it is possible to improve the possibility that the leaked fuel gas can be detected. That is, the tank compartment internal gas detector 44a may be configured to be located on the most downstream side of the flow path through which the fuel gas flows when the fuel gas leaks.

The tank compartment 40 has a sealed space therein except for the tank compartment air supply port 40g and the tank compartment exhaust port 40h. That is, the tank compartment 40 is sealed except for the tank compartment air supply port 40g and the tank compartment exhaust port 40h. In other words, the tank compartment 40 is sealed except for a ventilation port for ventilating the inside of the compartment (own compartment). Due to the sealed structure, as a general rule, the air entering the tank compartment 40 from the tank compartment air supply port 40g by driving the tank compartment air supply device 46 is discharged through the tank compartment exhaust port 40H from the tank compartment 40. To ensure sealing, similarly to the fuel cell compartment 30, a sealing material is appropriately arranged at a place where a gap may occur. For example, inside the tubular part 403 provided in the tank compartment 40, a sealing material for filling the gap between the fuel gas supply pipe 32 and the gas filling pipe 42, and an inner peripheral surface of the tubular part 403 is arranged.

In the present embodiment, the fuel cell compartment 30 and the tank compartment 40 including the emission source of the fuel are sealed except for a ventilation port for ventilating the inside of each compartment, and thus, it is possible to isolate an area not including the emission source of the fuel from an area including the emission source of the fuel. That is, it is possible to reduce the possibility that the fuel invades the area not including the emission source of the fuel and causes an ignition or an explosion.

(3-3. Duct Compartment)

Figure 8:
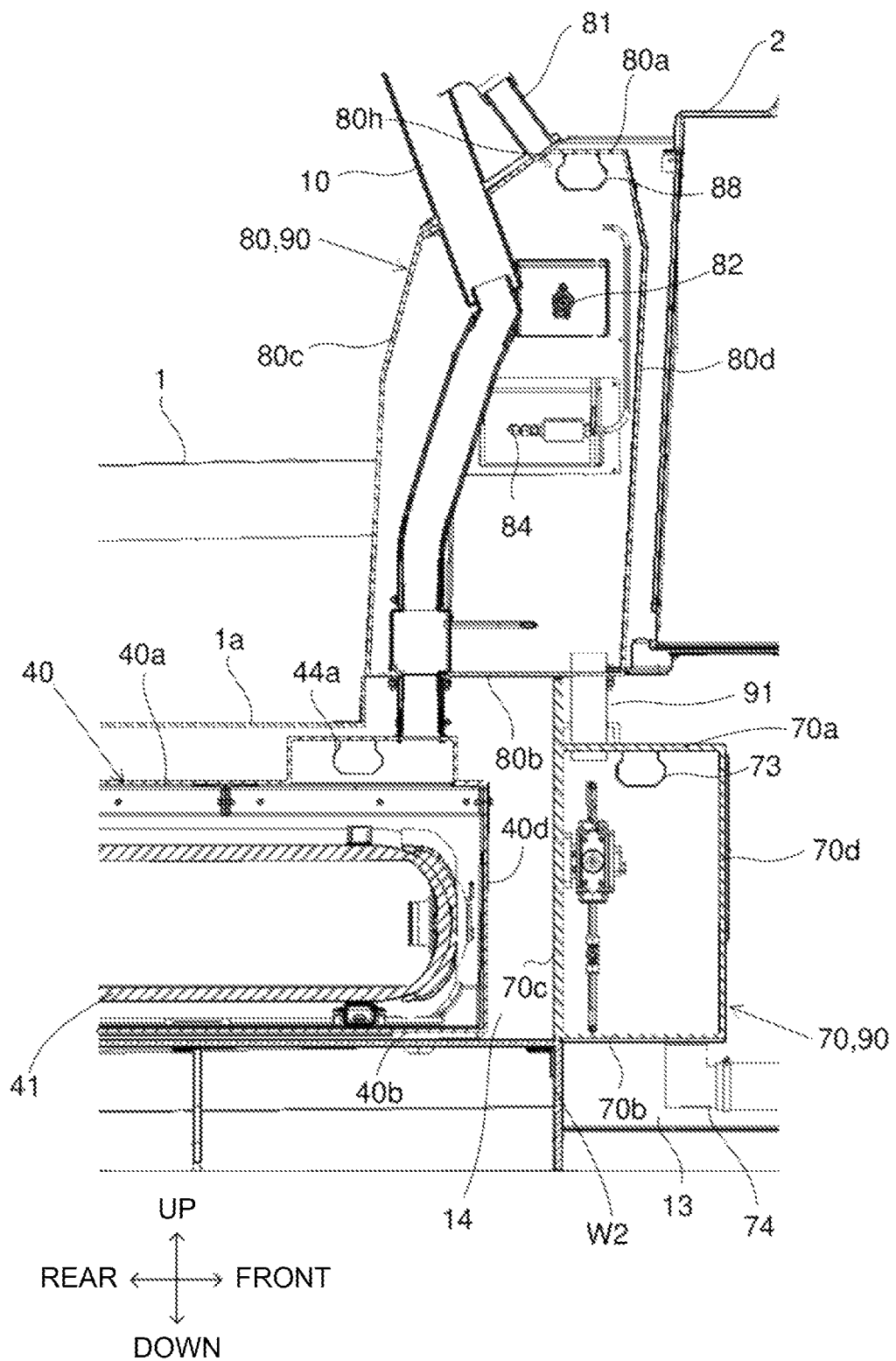
FIG. 8 is an enlarged view illustrating a part of a cross section taken along VIII-VIII of FIG. 3.

FIG. 8 is an enlarged view illustrating a part of a cross section taken along VIII-VIII of FIG. 3. FIG. 8 is a diagram illustrating a configuration of the duct compartment 90 arranged on the left side of the hull 1 and its surrounding area. That is, the duct compartment 90 and the tank compartment 40 illustrated in FIG. 8 belong to the compartment set on the left side (port side), of the two compartment sets arranged on the right side and the left side of the hull 1.

The duct compartment 90 is a housing body that houses various types of pipes (for example, see FIG. 2). As described above, the duct compartment 90 houses a part of the fuel gas supply pipe 32, for example. Further, as described above, the duct compartment 90 includes the lower duct compartment 70 and the upper duct compartment 80. The inside of the lower duct compartment 70 and the inside of the upper duct compartment 80 communicate with each other via a duct communication part 91 extending vertically. The duct communication part 91 can be regarded as a part of the duct compartment 90.

In the present embodiment, in detail, there are two duct communication parts 91 communicating the lower duct compartment 70 and the upper duct compartment 80 (see FIGS. 4 and 5). The number of the duct communication parts 91 is not limited to two, and may be one or three or more. In the following, details of the lower duct compartment 70 and the upper duct compartment 80 will be described.

<3-3-1. Lower Duct Compartment>

The lower duct compartment 70 is arranged below the deck 1a. Specifically, the lower duct compartment 70 is arranged in the engine room 13. In the engine room 13, the lower duct compartment 70 is located rearward of the fuel cell compartment 30. That is, the lower duct compartment 70 is located below the deck 1a between the fuel cell compartment 30 and the tank compartment 40 in the front-rear direction. The lower duct compartment 70 houses a part of the fuel gas supply pipe 32, and houses a part of the gas filling pipe 42.

As described above, the "part of the fuel gas supply pipe 32" housed in the lower duct compartment 70 may refer to all or a part of a portion of the fuel gas supply pipe 32 located between the fuel cell compartment 30 and the tank compartment 40. The "part of the gas filling pipe 42" housed in the lower duct compartment 70 may refer to all or a part of a portion of the gas filling pipe 42 located between the tank compartment 40 and the upper duct compartment 80. In the present embodiment, the lower duct compartment 70 houses a part of the portion located between the tank compartment 40 and the upper duct compartment 80 of the gas filling pipe 42.

The lower duct compartment 70 has a hollow shape. The lower duct compartment 70 can also be thought of as a container, a chamber, or a box that houses a part of the fuel gas supply pipe 32 and the like. In the present embodiment, the lower duct compartment 70 has a hollow and substantially rectangular parallelepiped shape. An outer wall configuring the lower duct compartment 70 includes, for example, a top wall 70a, a bottom wall 70b, a rear wall 70c, a front wall 70d, a left wall 70e, and a right wall 70f (for example, see FIGS. 2, 5, and 8). It is noted that the shape of the lower duct compartment 70 is not particularly limited as long as it has a space capable of housing a part of the fuel gas supply pipe 32 and the like. The material of the lower duct compartment 70 is, for example, FRP, but may be an iron plate and the like. Further, in the present embodiment, the rear wall 70 of the lower duct compartment 70 is configured by using the partition wall W2 partitioning the engine room 13 and the fuel room 14, but may be configured by not utilizing the partition wall W2.

As illustrated in FIG. 2, the lower duct compartment 70 further houses a part of the fuel gas discharge pipe 71. The fuel gas discharge pipe 71 is a pipe provided by branching from the fuel gas supply pipe 32 located in the lower duct compartment 70. For example, the fuel gas discharge pipe 71 is provided by branching from the fuel gas supply pipe 32 between the two shutoff valves SV.

More specifically, the fuel gas discharge pipe 71 is provided by branching from the fuel gas supply pipe 32 between the tank side shutoff valve 43 in the tank compartment 40 and the fuel cell side shutoff valve 33 in the fuel cell compartment 30. The fuel gas discharge pipe 71 extends from the inside of the lower duct compartment 70 to the inside of the upper duct compartment 80 via a below-described lower duct compartment communication port 70h and the duct communication part 91, and further communicates with the inside of the vent pipe 10. Therefore, the "part of the fuel gas discharge pipe 71" housed in the lower duct compartment 70 may refer to all or a part of a portion in the fuel gas discharge pipe 71 located between the portion branched from the fuel gas supply pipe 32 and the upper duct compartment 80. In the present embodiment, the lower duct compartment 70 houses a part of a portion in the fuel gas discharge pipe 71 arranged between the portion branched from the fuel gas supply pipe 32 and the upper duct compartment 80. It is preferable that as illustrated in FIG. 2, in a portion of the fuel gas discharge pipe 71 that joins the inside of the vent pipe 10, a discharge direction of the fuel gas is an open port side (distal end side) of the vent pipe 10. With such a configuration, it is possible to suppress the fuel gas discharged from the fuel gas discharge pipe 71 into the vent pipe 10 from flowing toward the tank compartment 40. As a result, it is possible to suppress the fuel gas discharged from the fuel gas discharge pipe 71 into the vent pipe 10 from being erroneously detected by the tank compartment internal gas detector 44a in the tank compartment 40.

The lower duct compartment 70 further houses the release valve 72. That is, the duct compartment 90 houses the release valve 72. The release valve 72 is an on-off valve installed in the fuel gas discharge pipe 71 to open or close the flow path of the fuel gas discharge pipe 71. The opening and closing of the release valve 72 is controlled by the control unit 12a. The release valve 72 may be installed in the upper duct compartment 80.

As described above, when the shutoff valve SV installed in the tank compartment 40 is the tank side shutoff valve 43 and the shutoff valve SV installed in the fuel cell compartment 30 is the fuel cell side shutoff valve 33, the fuel cell ship SH further includes, between the tank side shutoff valve 43 and the fuel cell side shutoff valve 33, the fuel gas discharge pipe 71 arranged to be branched from the fuel gas supply pipe 32 and the release valve 72 installed in the fuel gas discharge pipe 71.

The lower duct compartment 70 further houses a lower duct compartment internal gas detector 73. The lower duct compartment internal gas detector 73 is a fuel gas detector arranged inside the lower duct compartment 70. For example, if the fuel gas is hydrogen gas, the lower duct compartment internal gas detector 73 is configured by a hydrogen gas detection sensor.

The lower duct compartment internal gas detector 73 is arranged on the inner surface of the top wall 70a located at an upper portion of the lower duct compartment 70. Hydrogen gas as the fuel gas is lighter than air and rises. Therefore, if the lower duct compartment internal gas detector 73 is arranged on the top wall 70a of the lower duct compartment 70, even if the fuel gas leaks in the lower duct compartment 70, the leaked fuel gas can be appropriately detected by the lower duct compartment internal gas detector 73.

When the lower duct compartment internal gas detector 73 detects the fuel gas in the lower duct compartment 70, a detection signal is sent from the lower duct compartment internal gas detector 73 to the control unit 12a. As a result, the control unit 12a can control the shutoff valves SV provided in the fuel gas supply pipe 32 to stop the supply of the fuel gas from the fuel tank 41 to the fuel cell 31.

As illustrated in FIG. 2, the bottom wall 70b of the lower duct compartment 70 is provided with a lower duct compartment air supply port 70g. The lower duct compartment air supply port 70g is configured to include an opening penetrating in the up-down direction. The lower duct compartment air supply port 70g is connected to a duct compartment air supply pipe 74 described later. The lower duct compartment air supply port 70g may be provided on an outer wall other than the bottom wall 70d in the lower duct compartment 70.

The top wall 70a of the lower duct compartment 70 is provided with a lower duct compartment communication port 70h. The lower duct compartment communication port 70h is configured to include an opening penetrating in the up-down direction. The lower duct compartment communication port 70h communicates with the above-described duct communication part 91. The lower duct compartment communication port 70h may be provided on an outer wall other than the top wall 70a in the lower duct compartment 70.

The front wall 70d of the lower duct compartment 70 is provided with a cell compartment communication port 70i. The cell compartment communication port 70i is configured to include an opening penetrating in the front-rear direction. The cell compartment communication port 70 is connected to the cell compartment exhaust port 30h of the fuel cell compartment 30 described above via a communication pipe 92 extending in the front-rear direction. As a result, when the cell compartment air supply device 36 is driven, the air inside the fuel cell compartment 30 flows into the lower duct compartment 70 via the cell compartment exhaust port 30h, the communication pipe 92, and the cell compartment communication port 70i. The cell compartment communication port 70i may be provided on an outer wall other than the front wall 70d in the lower duct compartment 70.

In the present embodiment, the fuel gas supply pipe 32 passes through the inside of the communication pipe 92. In other words, the communication pipe 92 is arranged outside the fuel gas supply pipe 32 and configures a double pipe together with the fuel gas supply pipe 32. That is, the fuel cell ship SH further includes an outer pipe being arranged outside the fuel supply pipe and configuring a double pipe together with the fuel supply pipe. If a double pipe surrounding the fuel supply pipe with an outer pipe is employed, it is possible to reduce the possibility of the fuel entering the engine room 13 even if the fuel leak occurs in the fuel supply pipe.

A front end of the communication pipe 92 surrounds the cell compartment exhaust port 30h arranged in the fuel cell compartment 30 and is connected to the fuel cell compartment 30. That is, one end of the outer pipe configuring the double pipe is connected to the fuel cell compartment by surrounding a ventilation port for exhaust of the fuel cell compartment. With such a configuration, the double pipe structure provided for ensuring safety can be effectively utilized for an exhaust path for ventilation of the fuel cell compartment.

Further, in the present embodiment, a rear end of the communication pipe 92 is connected to the lower duct compartment 70 by surrounding the cell compartment communication port 70i provided in the lower duct compartment 70. Therefore, the lower duct compartment 70 and the fuel cell compartment 30 communicate with each other via the communication pipe 92. That is, the duct compartment and the fuel cell compartment communicate with each other via the outer pipe configuring the double pipe. Thus, it is possible to send the exhaust gas for ventilation of the fuel cell compartment to the inside of the duct compartment and discharge such an exhaust gas to the outside together with the exhaust gas for ventilation of the duct compartment. That is, it is possible to compactly configure the exhaust path for ventilation in the fuel cell ship SH.

It is preferable that the fuel gas supply pipe 32 configuring an inner pipe of the double pipe and the communication pipe 92 configuring the outer pipe are configured by a material having an equivalent performance in pressure resistance. For example, if the fuel gas supply pipe 32 is formed of stainless steel, it is preferable that the communication pipe 92 is also formed of stainless steel. However, for example, if a structure is adopted that allows the fuel gas to escape safely to the outside of the fuel cell ship SH by avoiding the explosion of an outer pipe even if the fuel gas leaks in the inner pipe, the outer pipe may be lower in pressure resistance performance than the inner pipe. In the present embodiment, such a structure is adopted, and thus, the fuel gas supply pipe 32 is formed of stainless steel, and the communication pipe 92 is formed of FRP.

A duct compartment air supply pipe 74 is connected to the lower duct compartment 70 (see, for example, FIGS. 2 and 8). The duct compartment air supply pipe 74 extends from the lower duct compartment air supply port 70g of the lower duct compartment 70 to the deck 1a and is exposed from the top of the deck 1*a*. A duct compartment air supply device 75 and a duct compartment external gas detector 76 are arranged at an end on the deck 1*a* side of the duct compartment air supply pipe 74. The duct compartment air supply device 75 and the duct compartment external gas detector 76 are arranged above the deck 1*a*.

The duct compartment air supply device 75 supplies the air outside the lower duct compartment 70 (duct compartment 90) (in the present example, air outside the ship) into the lower duct compartment 70 via the duct compartment air supply pipe 74 and the lower duct compartment air supply port 70*g*. Due to the supply of the air outside the lower duct compartment 70, the air inside the lower duct compartment 70 is discharged to the upper duct compartment 80 via the lower duct compartment communication port 70*h* and the duct communication part 91. Thus, the inside of the lower duct compartment 70 is ventilated. As a result, even if the fuel gas leaks from a pipe such as the fuel gas supply pipe 32 in the lower duct compartment 70, retention of the fuel gas can be suppressed.

The duct compartment air supply device 75 is configured by, for example, an inexpensive non-explosion-proof air supply fan, but may be configured by an explosion-proof air supply fan. The drive of the duct compartment air supply device 75 is controlled by the control unit 12*a*. Similarly to the above-described cell compartment air supply device 36, the duct compartment air supply device 75 is housed in an air supply device housing BO3 (see, for example, FIGS. 3 and 5) fixedly arranged on the deck 1*a*. The air supply device housing BO3 that houses the duct compartment air supply device 75 is connected with the filter unit FP3, similarly to the above-described cell compartment air supply device 36.

The duct compartment external gas detector 76 detects a combustible gas (for example, hydrogen gas floating around the hull 1) flowing into the duct compartment 90 from the outside. The duct compartment external gas detector 76 is, for example, a combustible gas sensor such as a hydrogen gas sensor. The duct compartment external gas detector 76 is arranged on a side opposite to the duct compartment air supply pipe 74 with respect to the duct compartment air supply device 75, that is, on the upstream side of the air flow from the outside into the duct compartment 90. The duct compartment external gas detector 76 may be configured by a gas sensor that detects a combustible gas other than hydrogen gas.

The duct compartment external gas detector 76 outputs, for example, a detection signal indicating the concentration of the combustible gas to the control unit 12*a*. This allows the control unit 12*a* to determine, based on the detection signal, whether the concentration of the combustible gas is equal to or greater than a predetermined threshold value. Then, if the concentration is equal to or greater than the predetermined threshold value, the control unit 12*a* can control the shutoff valves SV to stop the supply of the fuel gas from the fuel tank 41 to the fuel cell 31. The above-mentioned predetermined threshold value may be determined based on experiments and/or experience.

The above-described lower duct compartment internal gas detector 73 is arranged at a position close to the lower duct compartment communication port 70*h* or inside the lower duct compartment communication port 70*h* on the top wall 70*a* located at an upper portion of the lower duct compartment 70. In an unlikely event of the fuel gas leak from the fuel gas supply pipe 32 and the like in the lower duct compartment 70, the leaked fuel gas goes toward the upper duct compartment 80 through the lower duct compartment communication port 70*h*. That is, the lower duct compartment communication port 70*h* is located on the most downstream side of the flow path through which the fuel gas flows when the fuel gas leaks in the lower duct compartment 70. Therefore, as a result of the lower duct compartment internal gas detector 73 being arranged at a place near the lower duct compartment communication port 70*h* or inside the lower duct compartment communication port 70*h*, even if the fuel gas leaks at any location inside the lower duct compartment 70*h*, it is possible to increase the possibility that the leaked fuel gas can be detected.

The lower duct compartment 70 has a sealed space therein except for the lower duct compartment air supply port 70*g*, the lower duct compartment communication port 70*h*, and the cell compartment communication port 70*i*. That is, the lower duct compartment 70 is sealed except for the lower duct compartment air supply port 70*g*, the lower duct compartment communication port 70*h*, and the cell compartment communication port 70*i*. Due to the sealed structure, in principle, when the duct compartment air supply device 75 and the cell compartment air supply device 36 are driven, the air entering the lower duct compartment 70 from the lower duct compartment air supply port 70*g* and the cell compartment communication port 70*i* is discharged from the lower duct compartment 70 after passing through the lower duct compartment communication port 70*h*. To ensure sealing, a sealing material is appropriately arranged at a place where a gap may occur.

<3-3-2. Upper Duct Compartment>

The upper duct compartment 80 is arranged on the deck 1*a*. More specifically, the upper duct compartment 80 is arranged on the deck 1*a* to cover an area partially including the lower duct compartment 70 and the tank compartment 40. In the present embodiment, the upper duct compartment 80 is arranged rearward of the cabin 2 and is configured by using a member configuring the cabin 2. That is, it can be said that the upper duct compartment 80 is a part of the cabin 2. The upper duct compartment 80 houses a part of the fuel gas discharge pipe 71 and houses a part of the gas filling pipe 42.

In the present embodiment, the "part of the fuel gas discharge pipe 71" housed in the upper duct compartment 80 is a portion from the upper end of the duct communication part 91 to the vent pipe 10, of the fuel gas discharge pipe 71. Further, the "part of the gas filling pipe 42" housed in the upper duct compartment 80 is a portion from the fuel gas filling port 82 provided in the upper duct compartment 80 to the duct communication part 91, of the gas filling pipe 42. The duct communication part 91 configures a double pipe together with the fuel gas discharge pipe 71 and the gas filling pipe 42. As a result, even if the fuel gas leaks in the fuel gas discharge pipe 71 or the gas filling pipe 42, it is possible to prevent the fuel gas from entering the engine room 13. The duct communication part 91 is formed of, for example, FRP or stainless steel.

The upper duct compartment 80 has a hollow shape. The upper duct compartment 80 can also be thought of a container, a chamber, or a box that houses a part of the fuel gas discharge pipe 71 and the like. In the present embodiment, as illustrated in FIGS. 2 and 8, an outer wall configuring the upper duct compartment 80 includes, for example, a top wall 80*a*, a bottom wall 80*b*, a rear wall 80*c*, a front wall 80*d*, a left wall (not illustrated), and a right wall (not illustrated). Specifically, the rear wall 80*c* has an inclined structure inclined rearward as its slant goes downward. In more detail, the rear wall 80*c* is configured by a plurality of inclined parts having different inclination angles, and the plurality of inclined parts have a structure in which its upper side has a larger inclination than its lower side. The material of the upper duct compartment 80 is, for example, FRP, but may be an iron plate and the like. The shape of the upper duct compartment 80 is not particularly limited as long as it has a space capable of housing a part of the fuel gas discharge pipe 71 and the like.

As illustrated in FIG. 2, the fuel gas filling port 82 and a fuel gas check valve 83 are provided in the upper duct compartment 80. The fuel gas filling port 82 is connected to the gas filling pipe 42. The fuel gas check valve 83 is provided in the gas filling pipe 42. More specifically, the fuel gas check valve 83 is located between a branch portion between the gas filling pipe 42 and an inert gas pipe 87 described later, and the fuel gas filling port 82.

When the fuel gas is supplied from the fuel gas filling port 82, the fuel gas is supplied to the fuel tank 41 in the tank compartment 40 through the gas filling pipe 42 via the fuel gas check valve 83. As a result, the fuel gas is filled and stored in the fuel tank 41. The fuel gas check valve 83 is provided to prevent backflow of the fuel gas from the fuel tank 41 side to the fuel gas filling port 82.

The upper duct compartment 80 is further provided with an inert gas filling port 84, an on-off valve 85, an inert gas check valve 86, and an inert gas pipe 87. The inert gas filling port 84 is connected to the inert gas pipe 87. The inert gas pipe 87 is provided by branching from the gas filling pipe 42 in the upper duct compartment 80. The on-off valve 85 and the inert gas check valve 86 are provided in the inert gas pipe 87. In the inert gas pipe 87, the on-off valve 85 is located between the inert gas filling port 84 and the inert gas check valve 86.

The on-off valve 85 opens or closes the flow path of the inert gas pipe 87. In a configuration in which the inert gas check valve 86 is provided in the inert gas pipe 87, installation of the on-off valve 85 may be omitted.

When an inert gas is supplied to the inert gas filling port 84 and the on-off valve 85 opens the flow path of the inert gas pipe 87 in a state in which the fuel gas is not supplied to the fuel gas filling port 82, the inert gas is supplied to the fuel tank 41 in the tank compartment 40 through the inert gas check valve 86, and via the inert gas pipe 87 and the gas filling pipe 42. In addition, the tank side shutoff valve 43 opens the flow path of the fuel gas supply pipe 32, the fuel cell side shutoff valve 33 closes the flow path of the fuel gas supply pipe 32, and the release valve 72 opens the flow path of the fuel gas discharge pipe 71, whereby the fuel gas remaining in the fuel tank 41 is discharged to the vent pipe 10 via the fuel gas supply pipe 32 and the fuel gas discharge pipe 71. As a result, the fuel gas can be removed from the fuel tank 41 (purge process). There may be a pipe directly connected from the gas filling pipe 42 to the fuel gas supply pipe 32 between the fuel tank 41 and the tank side shutoff valve 43 (tank method). In this configuration, in a process of purging the inert gas of the fuel tank 41, the inert gas is filled into the fuel tank 41 in a state in which the tank side shutoff valve 43 is closed, and after that, it is necessary to open the tank side shutoff valve 43 for the purpose of facilitating the release of the inert gas from the fuel tank 41.

An upper duct compartment internal gas detector 88 is housed in the upper duct compartment 80. The upper duct compartment internal gas detector 88 is a fuel gas detector arranged inside the upper duct compartment 80. For example, if the fuel gas is hydrogen gas, the upper duct compartment internal gas detector 88 is configured by a hydrogen gas detection sensor.

The upper duct compartment internal gas detector 88 is arranged on the top wall 80*a* located at an upper portion of the upper duct compartment 80. Hydrogen gas as a fuel gas is lighter than air and rises. Therefore, even if the fuel gas leaks in the upper duct compartment 80, the leaked fuel gas can be appropriately detected by the upper duct compartment internal gas detector 88.

When the upper duct compartment internal gas detector 88 detects the fuel gas in the upper duct compartment 80, a detection signal is sent from the upper duct compartment internal gas detector 88 to the control unit 12*a*. As a result, the control unit 12*a* can control the shutoff valves SV provided in the fuel gas supply pipe 32 to stop the supply of the fuel gas from the fuel tank 41 to the fuel cell 31.

An upper duct compartment air supply port 80*g* is provided in the bottom wall 80*d* of the upper duct compartment 80. The upper duct compartment air supply port 80*g* is configured to include an opening penetrating in the up-down direction. The upper duct compartment air supply port 80*g* communicates with the duct communication part 91. Therefore, the upper duct compartment 80 communicates with the lower duct compartment 70 via the upper duct compartment air supply port 80*g*, the duct communication part 91, and the lower duct compartment communication port 70*h*. The upper duct compartment air supply port 80*g* may be provided on an outer wall other than the bottom wall 80*b* in the upper duct compartment 80.

An upper duct compartment exhaust port 80*h* is provided in the vicinity of a boundary between the rear wall 80*c* of the upper duct compartment 80 and the top wall 80*a*. The upper duct compartment exhaust port 80*h* is configured to include an opening penetrating the rear wall 80*c*. The upper duct compartment exhaust port 80*h* communicates with the vent pipe communication part 81. The vent pipe communication part 81 is a pipe. The inside of the upper duct compartment 80 communicates with the vent pipe 10 via the upper duct compartment exhaust port 80*h* and the vent pipe communication part 81. That is, the vent pipe communication part 81 is a pipe communicating the inside of the upper duct compartment 80 with the vent pipe 10.

The vent pipe 10 extends upward from the tank compartment 40 and passes through the interior of the upper duct compartment 80. More specifically, the vent pipe 10 penetrates through the bottom wall 80*b* of the upper duct compartment 80, enters the inside of the upper duct compartment 80, and goes out through the rear wall 80*c*.

In a state where the duct compartment air supply device 75 is driven, the air inside the upper duct compartment 80 is discharged to the outside of the ship through the vent pipe communication part 81 and the vent pipe 10. Thus, it is possible to ventilate the inside of the upper duct compartment 80. Even if the fuel gas leaks from the fuel gas discharge pipe 71 in the upper duct compartment 80, the leaked fuel gas is discharged to the outside of the ship through the vent pipe communication part 81 and the vent pipe 10. Thus, it is possible to prevent the leaked fuel gas from remaining in the upper duct compartment 80.

The upper duct compartment 80 and the lower duct compartment 70 communicate with each other via the duct communication part 91. As a result, (1) air taken into the inside of the lower duct compartment 70 via the duct compartment air supply pipe 74, (2) the fuel gas leaked from the fuel gas supply pipe 32 in the lower duct compartment 70 for some reason, and (3) air or the fuel gas discharged from the fuel cell compartment 30 to the lower duct compartment 70 via the communication pipe 92 can be discharged to the outside of the ship via the upper duct compartment 80 and the vent pipe 10. This enables suppression of the retention of fuel gas inside the lower duct compartment 70 and inside the fuel cell compartment 30.

The above-described upper duct compartment internal gas detector 88 is arranged at a position close to the upper duct compartment exhaust port 80h or inside the upper duct compartment exhaust port 80h. In an unlikely event of the fuel gas leak from the fuel gas discharge pipe 71 or the gas filling pipe 42 in the upper duct compartment 80, the leaked fuel gas moves toward the vent pipe 10 through the upper duct compartment exhaust port 80h. That is, the upper duct compartment exhaust port 80h is located on the most downstream side of the flow path through which the fuel gas flows when the fuel gas leaks in the upper duct compartment 80. Therefore, as a result of the upper duct compartment internal gas detector 88 being provided at a position close to the upper duct compartment exhaust port 80h or inside the upper duct compartment exhaust port 80h, even if the fuel gas leaks at any location inside the upper duct compartment 80, it is possible to detect the leaked fuel gas. In the present embodiment, as a preferred mode, the upper duct compartment internal gas detector 88 is installed at a position at which it is possible to detect hydrogen gas accumulated on a ceiling plate of the upper duct compartment 80. As a result, it is possible to quickly detect the leakage of the hydrogen gas even if there is no passage of air for ventilation.

The upper duct compartment 80 has a sealed space therein except for the upper duct compartment air supply port 80g and the upper duct compartment exhaust port 80h. That is, the upper duct compartment 80 is sealed except for the upper duct compartment air supply port 80g and the upper duct compartment exhaust port 80h. Due to the sealed structure, in principle, when the duct compartment air supply device 75 and the cell compartment air supply device 36 are driven, the air entering the upper duct compartment 80 from the upper duct compartment air supply port 80g is discharged from the upper duct compartment 80 after passing through the upper duct compartment exhaust port 80h. To ensure sealing, a sealing material is appropriately arranged at a place where a gap may occur.

As can be seen from the above description, the duct compartment 90 is sealed except for a ventilation port for ventilating the inside of the compartment (the duct compartment 90). In addition to the fuel cell compartment 30 and the tank compartment 40, the duct compartment including the emission source of the fuel is sealed except for the ventilation port for ventilating the inside, and thus, it is possible to further reduce the possibility that the fuel invades the area not including the emission source of the fuel and causes an ignition or an explosion.

(3-4. Supplement)

As described above, the plurality of compartments 30, 40, and 90 including the emission source of the fuel are independently provided with the ventilation devices 36, 46, and 75 used for ventilation. Therefore, it is possible to sufficiently secure the flow rate of air required for ventilation for each of the compartments 30, 40, and 90 including the emission source of the fuel. That is, it is possible to appropriately ventilate each compartment.

The ventilation devices 36, 46, and 75 are air supply devices that send air to the compartments 30, 40, and 90, as described above. In other words, the ventilation devices 36, 46, and 75 employ forced ventilation. As a result, the ventilation devices 36, 46, and 75 are arranged on the upstream side of the air flow when the compartments 30, 40, and 90 are ventilated, and thus, it is possible to prevent the fuel gas emitted from the emission source of the fuel in the compartments 30, 40, and 90 from passing through the ventilation device. That is, it is possible to avoid a situation in which the fuel gas ignites or explodes due to the passage of the fuel gas through the ventilation device (for example, due to an electric spark in the ventilation device). If the ventilation device employs forced ventilation, when the detectors 37, 47, and 75 that detect the fuel gas and the like are arranged nearby, it is possible to achieve an inexpensive explosion-proof ventilation device. Therefore, it is possible to reduce the cost required for a ventilation system for improving the safety.

It is preferred that at least two compartments, out of the tank compartment 40, the duct compartment 90, and the fuel cell compartment 30, share at least a part of the exhaust path for ventilation. With such a configuration, it is possible to simplify the ventilation system as compared with a case where the exhaust paths are formed separately.

In the present embodiment, as described above, the vent pipe 10 is provided as an exhaust path of the tank compartment 40. The exhaust gas from the duct compartment 90 is sent to the vent pipe 10 via the vent pipe communication part 81 and is exhausted to the outside of the ship. That is, a configuration is employed where at least a part of the exhaust path for the ventilation of the tank compartment 40 is utilized for the exhaust path for the ventilation of the duct compartment 90. As a result, the exhaust path of the tank compartment 40 and the duct compartment 90 can be shared to simplify the ventilation system.

In the present embodiment, as described above, the exhaust gas from the fuel cell compartment 30 is sent to the vent pipe 10 via the duct compartment 90 and exhausted to the outside of the ship. That is, a configuration is employed where at least a part of the exhaust path for the ventilation of the duct compartment 90 is utilized for the exhaust path for the ventilation of the fuel cell compartment 30. As a result, the exhaust path of the duct compartment 90 and the fuel cell compartment 30 can be shared to simplify the ventilation system.

In particular, in the present embodiment, in any of the fuel cell compartment 30, the tank compartment 40, and the duct compartment 90, the exhaust gas of the ventilation is finally exhausted to the outside of the ship through the vent pipe 10. That is, a configuration is employed where at least a part of the exhaust path for ventilation is shared by the three compartments 30, 40, and 90, and thus, it is possible to further simplify the ventilation system provided for ensuring safety.

[4. Points to Note]

The various technical features disclosed herein can be modified in various ways without departing from the gist of the technical creation. In addition, a plurality of embodiments and modifications described herein may be combined and implemented where possible.

Thus, the fuel cell ship SH is configured to include the duct compartment 90, but the duct compartment 90 may not be provided. For example, when a configuration is employed in which a curdle is arranged in the tank compartment and the fuel cell ship does not include a fuel filling port, the duct compartment may not be provided. A configuration in which the duct compartment is not provided will be described below.

Figure 9:
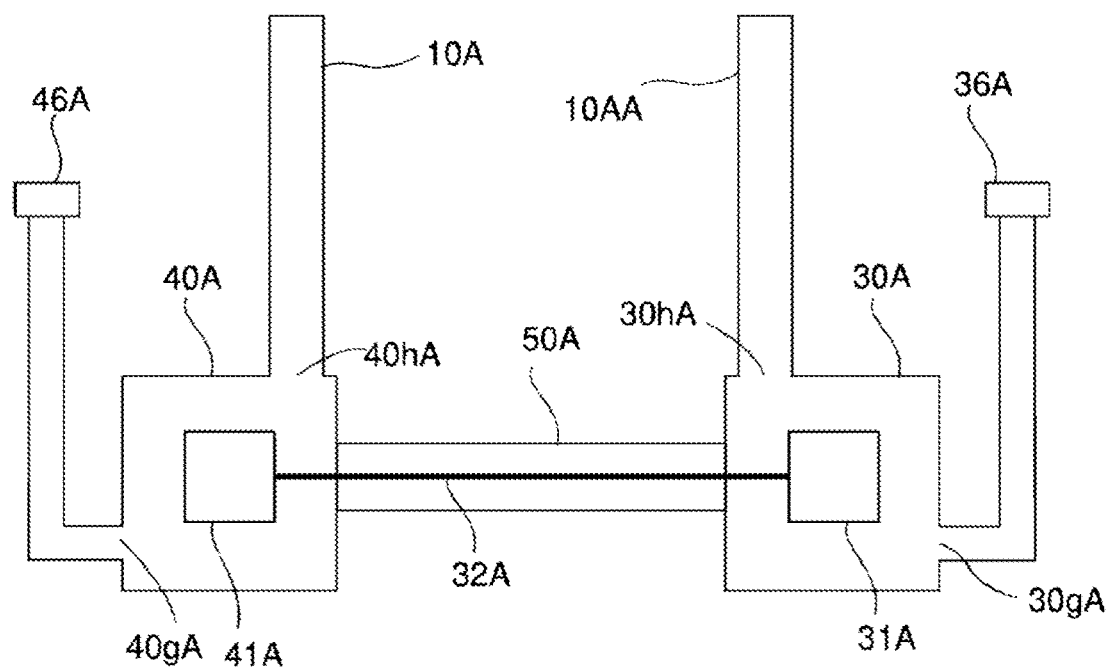
FIG. 9 is a diagram for explaining a fuel cell ship according to a first modification.

FIG. 9 is a diagram for explaining a fuel cell ship according to a first modification. The fuel cell ship according to the first modification includes, as a plurality of compartments including an emission source of the fuel, a fuel cell compartment 30A installed therein with a fuel cell 31A and a tank compartment 40A installed therein with a fuel tank 41A. A fuel gas supply pipe 32A supplies the fuel cell 31A with the fuel gas housed in the fuel tank 41A. The fuel gas supply pipe 32A is surrounded by an outer pipe 50A to suppress leakage of the fuel gas to the engine room. One end of the outer pipe 50A is connected to the fuel cell compartment 30A, and the other end of the outer pipe 50A is connected to the tank compartment 40A. However, the outer pipe 50A communicates with either one of the fuel cell compartment 30A or the tank compartment 40A, but does not communicate with the other. That is, the other of the fuel cell compartment 30A and the tank compartment 40A is provided with a hole through which the fuel gas supply pipe 32A passes and a sealing material is arranged to prevent generation of a gap between such a hole and the fuel gas supply pipe 32A.

When a cell compartment air supply device 36A is driven for ventilation, the air sent into the fuel cell compartment 30A through a cell compartment air supply port 30gA is discharged to outside the ship through a cell compartment vent pipe 10AA via a cell compartment exhaust port 30hA. When a tank compartment air supply device 46A is driven for ventilation, the air sent into the tank compartment 40A via a tank compartment air supply port 40gA is discharged to outside the ship through a tank compartment vent pipe 10A via a tank compartment exhaust port 40hA. With such a configuration, it is possible to achieve a configuration without a duct compartment.

Figure 10:
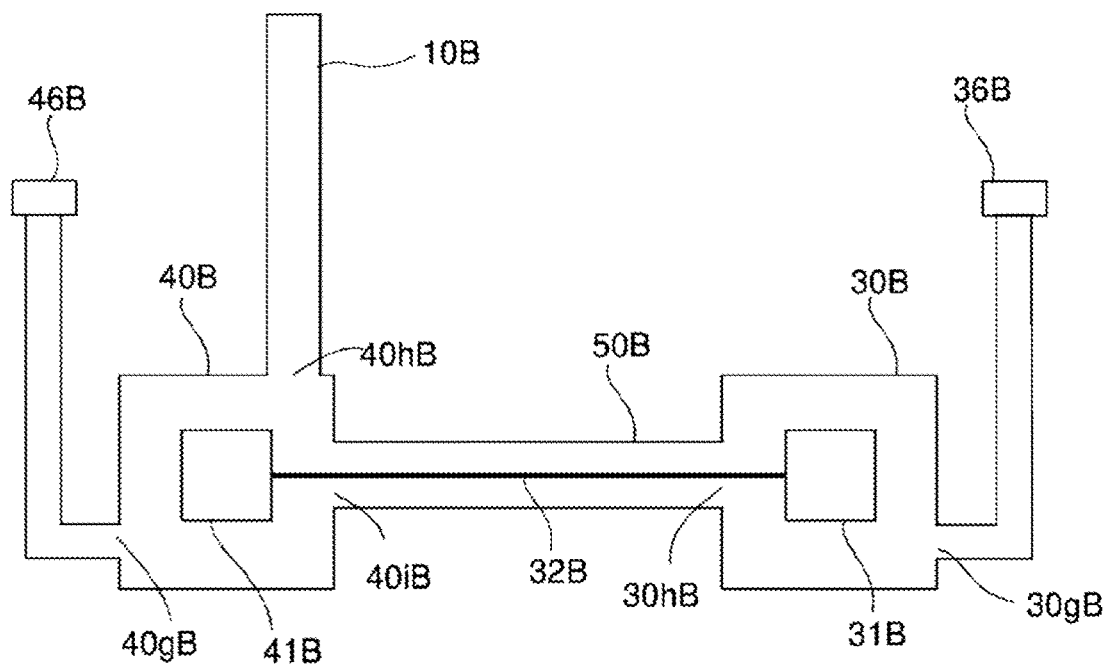
FIG. 10 is a diagram for explaining a fuel cell ship according to a second modification.

FIG. 10 is a diagram for explaining a fuel cell ship according to a second modification. Similarly to the first modification, the fuel cell ship according to the second modification includes, as a plurality of compartments including an emission source of the fuel, a fuel cell compartment 30B installed therein with a fuel cell 31B and a tank compartment 40B installed therein with a fuel tank 41B. A fuel gas supply pipe 32B supplies the fuel cell 31B with the fuel gas housed in the fuel tank 41B. The fuel gas supply pipe 32B is surrounded by an outer pipe 50B to suppress leakage of the fuel gas to the engine room. One end of the outer pipe 50B is connected to the fuel cell compartment 30B, and the outer pipe 50B communicates with the inside of the fuel cell compartment 30B via a cell compartment exhaust port 30hB. The other end of the outer pipe 50B is connected to the tank compartment 40B, and the outer pipe 50B communicates with the inside of the tank compartment 40B via a cell compartment communication port 40iB.

A state is assumed where a cell compartment air supply device 36B and a tank compartment air supply device 46B for ventilation are driven. In this case, the air sent into the fuel cell compartment 30B via a cell compartment air supply port 30gB enters into the tank compartment 40B via the cell compartment exhaust port 30hB, the outer pipe 50B, and the cell compartment communication port 40iB, and is discharged to outside the ship via a tank compartment exhaust port 40hB and a vent pipe 10B. The air sent into the tank compartment 40B via a tank compartment air supply port 40gB is discharged to outside the ship via the tank compartment exhaust port 40hB and the vent pipe 10B. With such a configuration also, it is possible to achieve a configuration without a duct compartment.

In the configuration according to the second modification, a configuration is employed where at least a part of the exhaust path for ventilation of the tank compartment 40B is utilized for a part of the exhaust path for ventilation of the fuel cell compartment 30B. However, as a configuration where the vent pipe 10B is provided in the fuel cell compartment 30B rather than in the tank compartment 40B, a configuration may be employed where at least a part of the exhaust path for ventilation of the fuel cell compartment 30B is utilized for a part of the exhaust path for ventilation of the tank compartment 40B. That is, a configuration may be employed where at least a part of the exhaust path for ventilation of the fuel cell compartment 30B and at least a part of the exhaust path for ventilation of the tank compartment 40B are used in common. Such a configuration enables the ventilation system provided to improve the safety to be simplified as compared with a case where the exhaust paths of the compartments 30B and 40B are formed separately. It is noted that the exhaust of the tank compartment 40B is the most dangerous exhaust in the ship, and thus, a configuration is preferably employed where the air is directly discharged outside of the ship without passing through another compartment. This enables reduction of the possibility that another compartment is at risk.

REFERENCE SIGNS LIST

1 . . . Hull
30, 30A, 30B . . . Fuel cell compartment
30g, 30gA, 30gB . . . Cell compartment air supply port (ventilation port)
30h, 30hA, 30hB . . . Cell compartment exhaust port (ventilation port)
31, 31A, 31B . . . Fuel cell
32, 32A, 32B . . . Fuel gas supply pipe (fuel supply pipe)
36, 36A, 36B . . . Cell compartment air supply device (ventilation device)
40, 40A, 40B . . . Tank compartment
40g, 40gA, 40gB . . . Tank compartment air supply port (ventilation port)
40h, 40hA, 40hB . . . Tank compartment air supply port (ventilation port)
40iB . . . Cell compartment communication port (ventilation port)
41, 41A, 41B . . . Fuel tank
46, 46A, 46B . . . Tank compartment air supply device (ventilation device)
70 . . . Lower duct compartment (duct compartment)
70g . . . Lower duct compartment air supply port (ventilation port)
70i . . . Cell compartment communication port (ventilation port)
75 . . . Duct compartment air supply device (ventilation device)
80 . . . Upper duct compartment (duct compartment)
80h . . . Upper duct compartment exhaust port (ventilation port)
90 . . . Duct compartment
92 . . . Communication pipe (outer pipe)
SH . . . Fuel cell ship

The invention claimed is:

1. A fuel cell ship for propelling a hull by using electric power supplied by a fuel cell configured to generate electric power through an electrochemical reaction of fuel, the fuel cell ship comprising:
   a plurality of compartments including an emission source of the fuel,
   wherein the plurality of compartments include:
      a tank compartment installed therein with a fuel tank configured to store the fuel; and
      a fuel cell compartment installed therein with the fuel cell,
   the tank compartment and the fuel cell compartment are each sealed except for a ventilation port for ventilating inside thereof; and each of the plurality of compartments is independently provided with a ventilation device configured to enable ventilation.

2. The fuel cell ship according to claim 1, wherein the ventilation device is configured to employ forced ventilation.

3. The fuel cell ship according to claim 1, wherein at least a part of an exhaust path for the ventilation of the fuel cell compartment and at least a part of an exhaust path for the ventilation of the tank compartment are used in common.

4. The fuel cell ship according to claim 1, further comprising:
a fuel supply pipe that connects the fuel tank and the fuel cell; and
an outer pipe arranged outside the fuel supply pipe, the outer pipe configuring a double pipe together with the fuel supply pipe,
wherein one end of the outer pipe surrounds the ventilation port for exhaust of the fuel cell compartment and is connected to the fuel cell compartment.

5. The fuel cell ship according to claim 1, further comprising:
a fuel supply pipe that connects the fuel tank and the fuel cell, wherein the plurality of compartments further include a duct compartment that houses a part of the fuel supply pipe, and the duct compartment is sealed except for the ventilation port.

6. The fuel cell ship according to claim 5, wherein:
each of the plurality of compartments is independently provided with a ventilation device configured to enable ventilation, and
at least two compartments, out of the tank compartment, the duct compartment, and the fuel cell compartment, share at least a part of an exhaust path for the ventilation.

7. The fuel cell ship according to claim 6, wherein at least a part of an exhaust path for the ventilation of the tank compartment is configured to be utilized for an exhaust path for the ventilation of the duct compartment.

8. The fuel cell ship according to claim 6, wherein at least a part of an exhaust path for the ventilation of the duct compartment is configured to be utilized for an exhaust path for the ventilation of the fuel cell compartment.

9. The fuel cell ship according to claim 8, further comprising:
an outer pipe arranged outside the fuel supply pipe, the outer pipe configuring a double pipe together with the fuel supply pipe,
wherein the duct compartment and the fuel cell compartment are configured to communicate with each other via the outer pipe.

10. The fuel cell ship according to claim 1, wherein each ventilation device is configured to continuously ventilate each respective compartment.

11. A fuel cell ship for propelling a hull by using electric power supplied by a fuel cell configured to generate electric power through an electrochemical reaction of fuel, the fuel cell ship comprising:
a plurality of compartments including an emission source of the fuel,
wherein the plurality of compartments include:
a tank compartment installed therein with a fuel tank configured to store the fuel; and
a fuel cell compartment installed therein with the fuel cell, and
the tank compartment and the fuel cell compartment are each sealed except for a ventilation port for ventilating inside thereof; and
a fuel supply pipe that connects the fuel tank and the fuel cell, wherein the plurality of compartments further include a duct compartment that houses a part of the fuel supply pipe, and the duct compartment is sealed except for the ventilation port.

12. The fuel cell ship according to claim 11, wherein each of the plurality of compartments is independently provided with a ventilation device configured to enable ventilation, and
at least two compartments, out of the tank compartment, the duct compartment, and the fuel cell compartment, share at least a part of an exhaust path for the ventilation.

13. The fuel cell ship according to claim 12, wherein at least a part of an exhaust path for the ventilation of the tank compartment is configured to be utilized for an exhaust path for the ventilation of the duct compartment.

14. The fuel cell ship according to claim 12, wherein at least a part of an exhaust path for the ventilation of the duct compartment is configured to be utilized for an exhaust path for the ventilation of the fuel cell compartment.

15. The fuel cell ship according to claim 14, further comprising:
an outer pipe arranged outside the fuel supply pipe, the outer pipe configuring a double pipe together with the fuel supply pipe,
wherein the duct compartment and the fuel cell compartment are configured to communicate with each other via the outer pipe.

16. The fuel cell ship according to claim 12, wherein each ventilation device is configured to continuously ventilate each respective compartment.

\* \* \* \* \*